United States Patent
Hamilton et al.

(12) 
(10) Patent No.: US 7,305,658 B1
(45) Date of Patent: Dec. 4, 2007

(54) METHOD AND SYSTEM FOR APPLICATION PARTITIONS

(75) Inventors: Keith S. Hamilton, Sammamish, WA (US); Steve Jamieson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 09/850,458

(22) Filed: May 7, 2001

(51) Int. Cl.
*G06F 9/44* (2006.01)
*G06F 15/16* (2006.01)
*G06F 7/00* (2006.01)

(52) U.S. Cl. .......................... 717/120; 709/203; 707/9

(58) Field of Classification Search ................ 717/120, 717/163–167; 719/332
See application file for complete search history.

(56) References Cited

U.S. PATENT DOCUMENTS

| | | | |
|---|---|---|---|
| 5,771,381 A | 6/1998 | Jones et al. ................ 713/100 |
| 5,941,943 A * | 8/1999 | Brenner et al. ............. 709/201 |
| 5,996,013 A | 11/1999 | Delp et al. |
| 6,134,603 A | 10/2000 | Jones et al. |
| 6,151,700 A | 11/2000 | Fox |
| 6,249,836 B1 | 6/2001 | Downs et al. |
| 6,262,726 B1 | 7/2001 | Stedman et al. |
| 6,393,491 B1 | 5/2002 | Bracha et al. |
| 6,457,060 B1 | 9/2002 | Martin et al. |
| 6,509,913 B2 | 1/2003 | Martin, Jr. et al. |
| 6,512,526 B1 | 1/2003 | McGlothlin et al. |
| 6,523,065 B1 | 2/2003 | Combs et al. |
| 6,542,926 B2 * | 4/2003 | Zalewski et al. ........... 709/213 |
| 6,557,068 B2 | 4/2003 | Riley et al. |
| 6,567,974 B1 * | 5/2003 | Czajkowski ................ 717/151 |
| 6,571,245 B2 | 5/2003 | Huang et al. |
| 6,578,037 B1 * | 6/2003 | Wong et al. .................. 707/10 |
| 6,594,671 B1 * | 7/2003 | Aman et al. ............ 707/103 R |
| 6,687,717 B1 | 2/2004 | Hamilton et al. |
| 6,721,881 B1 | 4/2004 | Bian et al. |
| 6,728,750 B1 | 4/2004 | Anderson et al. |
| 6,751,797 B1 | 6/2004 | Desgranges et al. |
| 7,024,471 B2 | 4/2006 | George et al. |
| 2002/0004850 A1 | 1/2002 | Sudarshan et al. |

(Continued)

OTHER PUBLICATIONS

Clarke, David G., John M. Potter and James Noble, "Ownership Types for Flexible Alias Protection," Oct. 1998, ACM Press, Proceedings of the 13th ACM SIGPLAN Conference on Object-Oriented Programming, Systems, Languages and Applications, pp. 48-64.*

(Continued)

*Primary Examiner*—Tuan Dam
*Assistant Examiner*—Michael Yigdall
(74) *Attorney, Agent, or Firm*—Merchant & Gould PC

(57) ABSTRACT

Systems and methods for activating a component in a computing system having a plurality of partitions. One method includes receiving a request to activate a component having an object class ID and a partition ID and detecting if the object class ID is contained within a default partition corresponding to the partition ID. If the object class ID is contained within the default partition, an instance of the component in the partition ID is activated. If the object class ID is not contained within the default partition, the method includes detecting if the object class ID is contained within a base partition. If the object class ID is contained in the base partition, an instance of the component in the base partition is activated.

21 Claims, 18 Drawing Sheets

U.S. PATENT DOCUMENTS

2002/0113899 A1 8/2002 Swan
2002/0122061 A1 9/2002 Martin, Jr. et al.
2002/0133805 A1* 9/2002 Pugh et al. ................. 717/120

OTHER PUBLICATIONS

Thomas, Anne; Enterprise JavaBeans Technology: Server Component Model for the Java Platform; Patricia Seybold Group (Dec. 1998).

U.S. Appl. No. 09/850,289, "Method and System for Application Partitions," filed May 7, 2001.

U.S. Appl. No. 09/850,318, "Public and Private Components Operating within Multiple Applications of a Component-based Computing System," filed May 7, 2001.

U.S. Appl. No. 09/850,489, "Method and System for Application Partitions," filed May 7, 2001.

* cited by examiner

METHOD AND SYSTEM FOR APPLICATION PARTITIONS

TECHNICAL FIELD

The invention relates generally to activating instances of a component-based software application, and more particularly to a component-based computing system having multiple partitions for providing component addressing/identification and naming spaces.

BACKGROUND

Computing systems that provide continuous services to a base of users or remote clients have struggled with the task associated with maintaining and operating multiple versions of a set of applications or components as upgrades to existing systems are installed. In the past, installations would need to be made upon a second server, and at some point in time, all new requests for services are routed to the new servers until all pending actions are completed on the server running the older version of the applications. A separate server is typically needed because a component's class ID is set within the binary version of the component at compile time and because the class Ids must be unique within a computing system.

Additionally, some computing systems need to provide functionality to various users depending upon the rights the user has been granted by a directory system. While this additional functionality may be limited to a subset of all users, the majority of the functionality provided by an application is common to most, if not all, users. Current component-based programming systems implement these different sets of functionality using different components. However, developers who wish to simply alter one component to provide the additional functionality to a small subset of users are required to recompile a significant amount of code in order to assign a new class ID to the newly generated component that implements the new functionality.

This has disadvantages. One such disadvantage is that it is inconvenient and expensive in terms of the number of servers required and in the administration of those servers. Another such disadvantage is that it is difficult to update shared components. Another disadvantage is that a test version of an application cannot be executed on the same server as a production version of an application. Therefore improvement are desirable.

SUMMARY

In accordance with the present invention, the above and other problems are solved by the following:

In one aspect of the present invention, a method of activating a component in a computing system having a plurality of partitions is described. The method includes receiving a request to activate a component having an object class ID and a partition ID and detecting if the object class ID is contained within a default partition corresponding to the partition ID. If the object class ID is contained within the default partition, an instance of the component in the partition ID is activated. If the object class ID is not contained within the default partition, the method includes detecting if the object class ID is contained within a base partition. If the object class ID is contained in the base partition, an instance of the component in the base partition is activated.

In another aspect of the present invention, a system for activating a component in a computing system having a plurality of partitions is described. The system includes a receive module, a default module, a first activate module, a base module, and a second activate module. The receive module receives a request to activate a component having an object class ID and a partition ID. The default module detects if the object class ID is contained within a default partition corresponding to the partition ID. The first activate module activates an instance of the component in the partition ID if the object class ID is contained within the default partition. The base module detects if the object class ID is contained within a base partition if the object class ID is not contained within the default partition. A second activate module activates an instance of the component in the base partition if the object class ID is contained in the base partition.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, that are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes methods, systems, and an article of manufacture for having multiple application partitions on a single machine. Partitions are a logical grouping of applications. A partition is similar to a virtual machine but the partition exists in the application layer. As such, a single server can contain numerous partitions and each partition is independent of one another. Each partition can contain different versions or configurations of components associated with the application software.

Having application partitions allows an application's user-base to be segmented, such that each group of users can execute a specific version or configuration of an application. In addition, partitions allow numerous versions or configurations of an application to reside and execute on the same machine with each version or configuration being separately managed and maintained. For example, an Information Technology group could have separate test, production, and training versions of an application installed on a single machine. An application service provider could host different versions of an application on the same machine.

Figure 1:
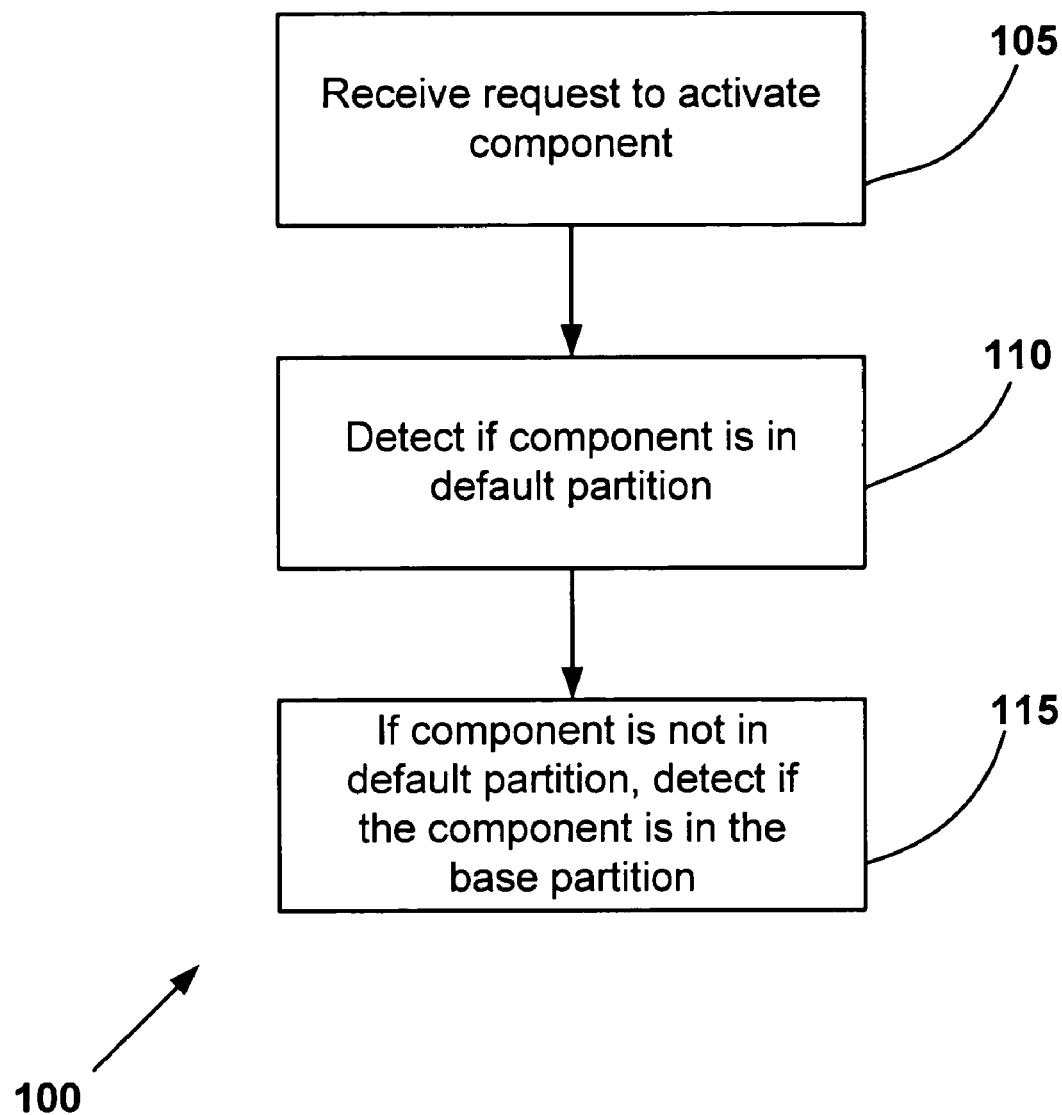
FIG. 1 is a schematic representation of methods and systems for activating a component in a computing system, according to an exemplary embodiment of the present invention.

Referring now to FIG. 1, a schematic representation of an inheritance system 100 for activating components in a computing system is illustrated. At block 105, the inheritance system 100 receives a request to activate a component of a software application. At block 110, the inheritance system 100 detects if the component is in the default partition. At block 115, if the component is not in the default partition, the inheritance system 100 detects if the component is in the base partition.

Figure 2:
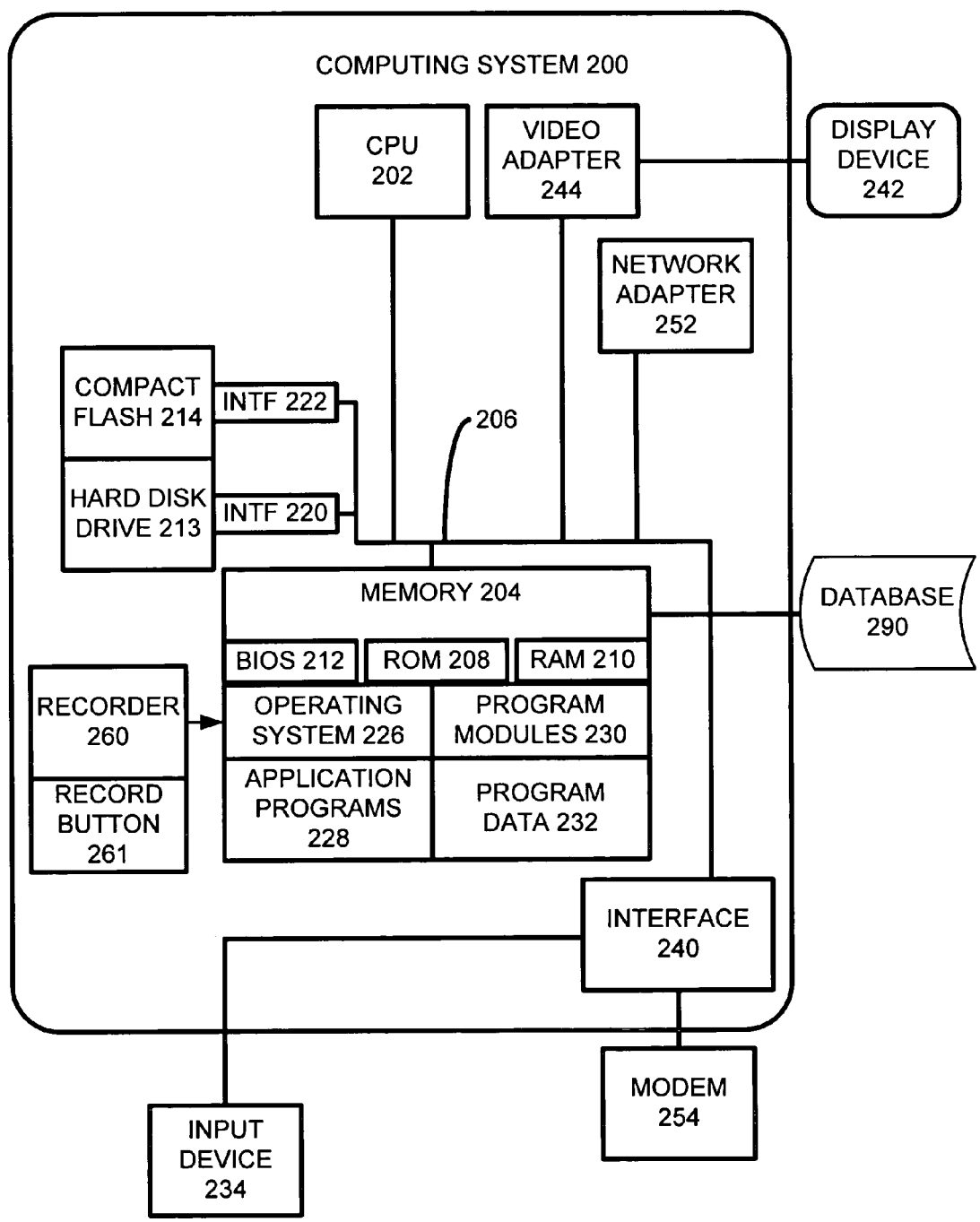
FIG. 2 is a schematic representation of a computing system that may be used to implement aspects of the present invention.

FIG. 2 and the following discussion are intended to provide a brief, general description of a suitable operating environment in which the invention might be implemented. The operating environment is only one example of a suitable operating environment and is not intended to suggest any limitation as to the scope of use or functionality of the invention. Although not required, the invention is described in the general context of computer-executable instructions, such as program modules, being executed by a computing system. Generally, program modules include routines, programs, objects, components, data structures, etc. that perform particular tasks or implement particular abstract data types.

Those skilled in the art will appreciate that the invention might be practiced with other computer system configurations, including personal computers, server computers, handheld or laptop devices, palm devices, multiprocessor systems, microprocessor-based systems, programmable consumer electronics, network personal computers, minicomputers, mainframe computers, distributed computing environments that include any of the above systems or devices, and the like. The invention might also be practiced in distributed computing environments where tasks are performed by remote processing devices that are linked through a communications network. In a distributed computing environment, program modules might be located in both local and remote memory storage devices.

Referring now to FIG. 2, an exemplary environment for implementing embodiments of the present invention includes a general purpose-computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
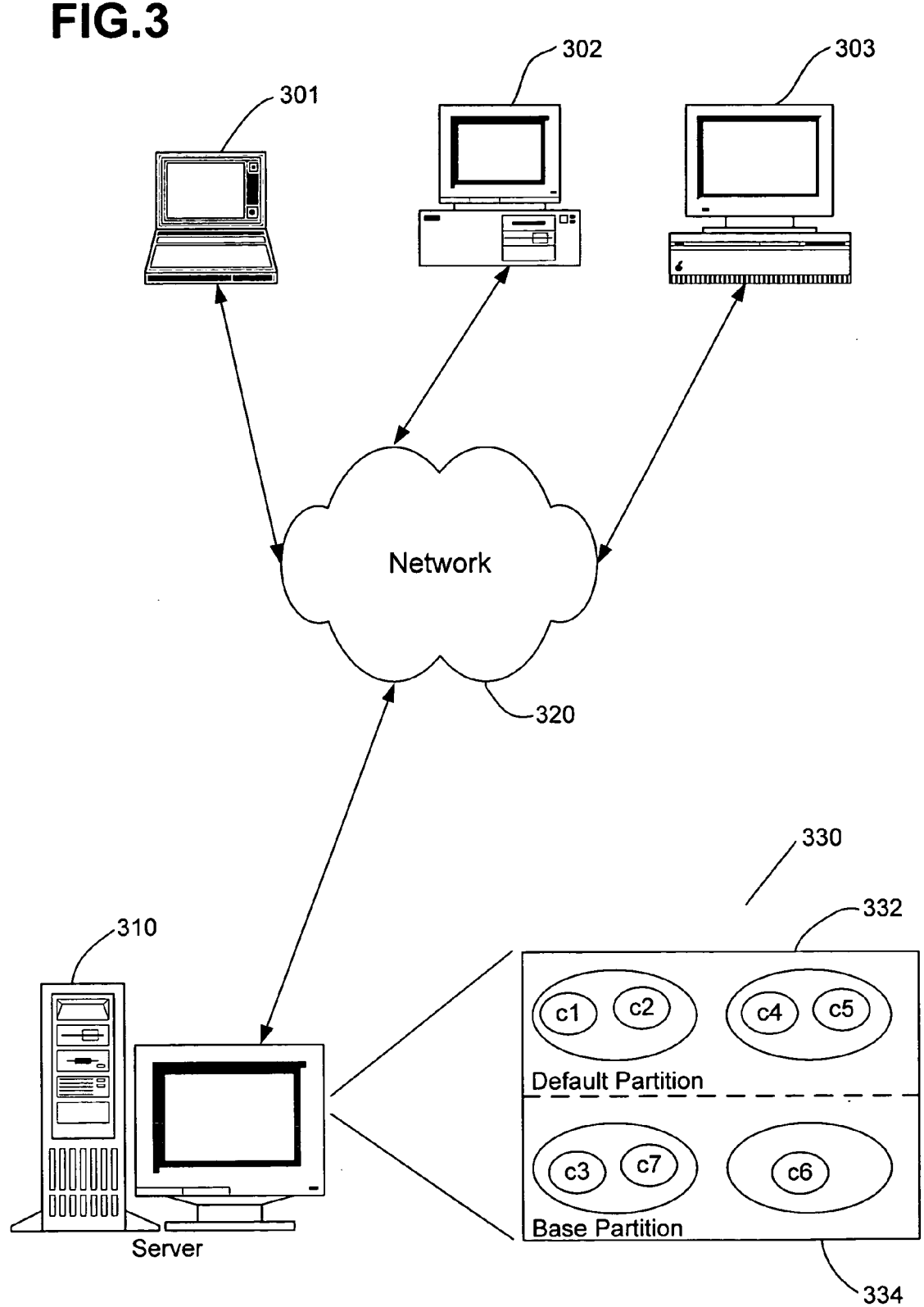
FIG. 3 illustrates a distributed computing environment for using components within multiple partitions located on a remote server that may be used to implement aspects of the present invention.

FIG. 3 illustrates a distributed computing environment for executing components within multiple partitions located on a remote server according to an example embodiment of the present disclosure. In an exemplary embodiment, remotely located client computing systems 301-303 access programmable computing processing components on a remote server 310 across a communications network 320. Preferably, the server 310 includes programming partitions 330.

There might be any number of ways that an administrator might want to group applications in partitions. For example, the administrator might want a production partition, that contains all the applications that are in production, and a test partition, that contains newer versions of the applications being tested. In addition, an application service provider might want to create a partition for each customer. Applications consist of components, and can be installed into one or more partitions. Only one version of a particular component can exist in an application.

Preferably, programming partitions 330 include at least a default partition 332 and a base partition 334. Of course, multiple default partitions might be included on the server 310. When a client 301-303 attempts to access a component within the server 310, the identity of the client 301-303 is used to select a default partition, such as the default partition 332, from among all of the partitions found within the server 310.

A partition provides a name space and class ID space for the components located within that partition. The name space, however, does not span more than one partition. As such, a component within a first partition may contain a name and unique class ID that is identical to a name and class ID for a component within a second partition even though the two components are completely different.

When a client process attempts to activate a component with a given name and unique class ID, the component activated will correspond to the component within a partition that is identified as the default partition for the client. If the requested component is not present within the default partition, the component activated will be the component having the desired name and class ID within the base partition. Each client 301-303 accessing components on the server 310 will have a default partition 332 selected, based upon the identity of the client 301-303, and a base partition 334. The client 301-303 might also activate a component by expressly specifying the partition to be used in locating the component through the use of a partition moniker.

When an active component on the server 310 needs to activate additional components to complete one or more processing tasks, the component selected for activation uses the identity of the original calling client to determine in which partition to find the component to be selected. While this example embodiment operates within a client-server environment, one skilled in the art will recognize that the use of partitions as disclosed herein is not limited to such a programming environment because the client processes that cause components to be activated according to the present disclosure, as recited within the attached claims, might also be located within the server as 310 well as being located within remote client computing systems 301-303.

The processing performed pursuant to the present disclosure corresponds to the process followed when a component is activated. These components are typically individual object-oriented programming modules and the process of activating a component corresponds to the process of creating an instance of the component that is to be used to provide a function or operation to be performed for a given client 301-303. Once a component has been instantiated and is active, the instance of the component may be called one or more times to perform a desired operation. However, the processing associated with the present disclosure typically concerns the processing performed to identify the component when it is being activated and instantiated, rather than when the already active instance of the component is called a second time.

Preferably, a partition structure includes a base application partition that is unique. All other partitions inherit components from the base application partition. By the term "inherits," it is meant that all other partitions contain components from the base partition. In other words, the base partition is an extension of the other partitions. If an activation of a component is being performed in a certain partition but the component is not contained within that partition, then the component is activated from the base application partition. The base application partition is where system-wide components are typically installed since users of all partitions and all users who are not mapped to any particular partition will be able to activate them.

Figure 4:
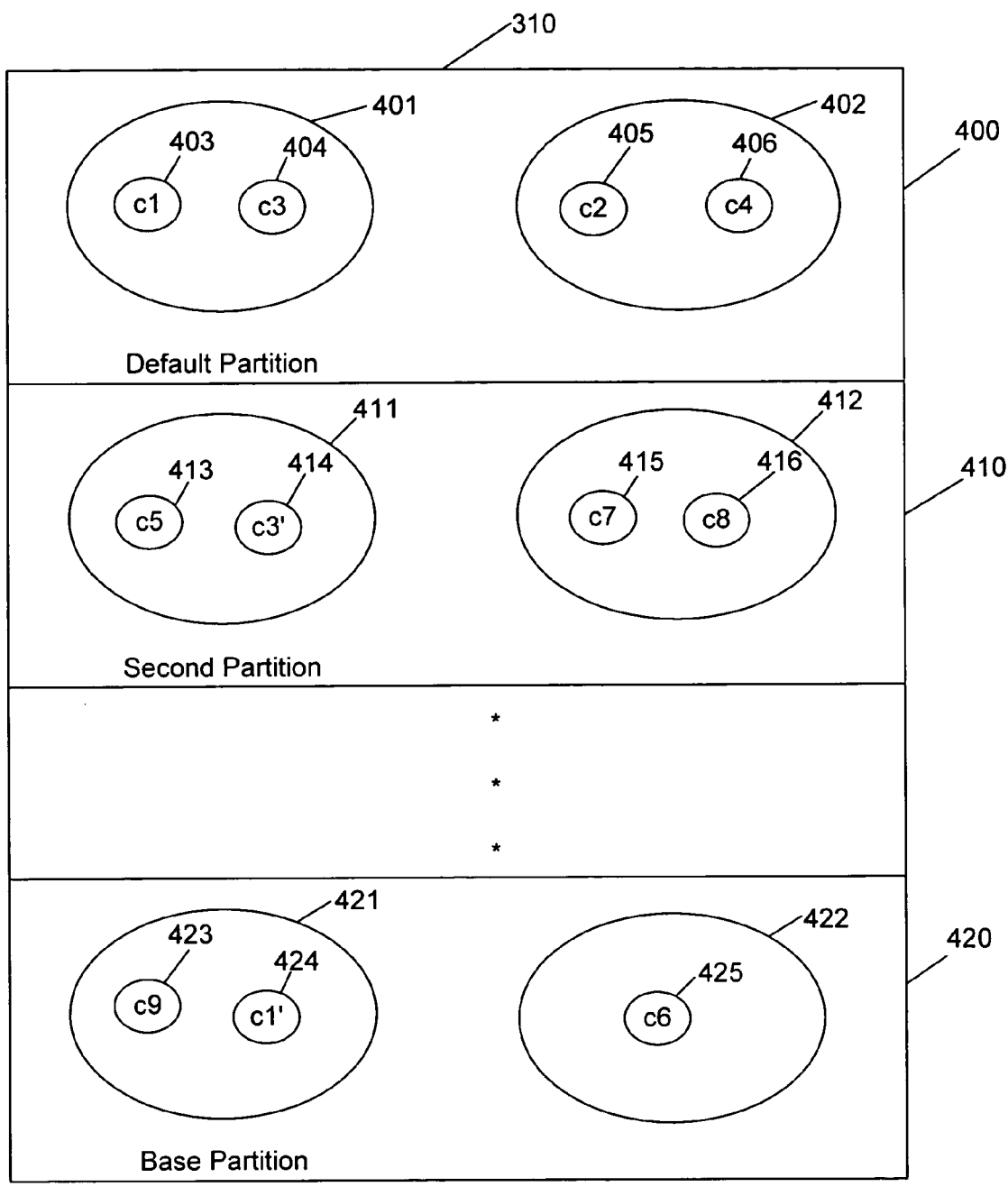
FIG. 4 illustrates multiple partitions containing programmable components within a remote server according to an exemplary embodiment of the present invention.

FIG. 4 illustrates multiple partitions containing programmable components within a remote server in an example embodiment of the present disclosure. As discussed above, an attempt to activate a component on the server 310 will cause up to two different partitions to be searched in an attempt to locate the desired component. These two partitions include the default partition 400 and a base partition 420. Within the default partition 400, one or more component-based applications 401-402 might be located. Each of these applications 401-402 might itself contain one or more programmable components 403-406, respectively. The individual components 403-406 are the items being activated. Similarly, the base partition 420 also might contain one or more component-based applications 421-422 that might themselves contain one or more programmable components 423-425.

The server 310 might also contain one or more additional partitions, identified here as a second partition 410. This second partition 410 is a partition identical to either the default partition 400 or the base partition 420 as these labels are merely applied to any partition on the server 310 to determine which partitions are to be searched according to a particular order when locating a component for activation. As such, the second partition 410 might contain one or more component-based applications 411-412 that might themselves contain one or more programmable components 413-416.

Figure 5:
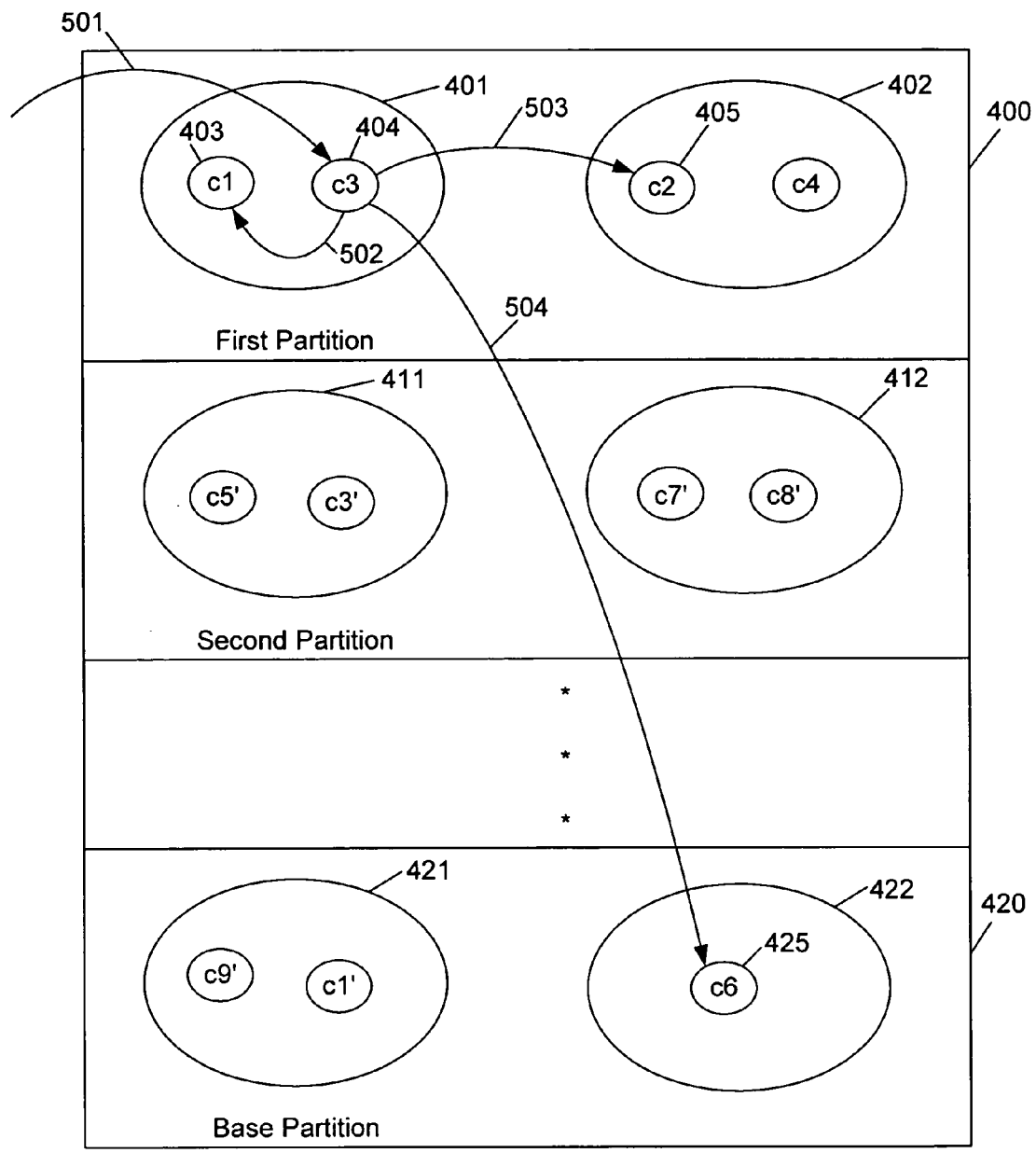
FIG. 5 illustrates a sequence of calls requiring activation of various components within a first partition set to a default partition according to another exemplary embodiment of the present invention.

FIG. 5 illustrates a sequence of calls requiring the activation of various components within a first partition 400 set to a default partition according to another embodiment of the present invention. In this particular embodiment, the default partition to be searched corresponds to a partition identified as the first partition 400. When a client 301-303, FIG. 3, makes a call to the server 310 that requires the activation of a component, the server 310 determines the identity of the default partition, or first partition, 400 and the base partition 420 that corresponds to the identity of the client 301-303 making the call. In other words, the client is mapped to a default partition. In this example, a call 501 to component 'c3' 404 is being made. The server 310 locates a component within the default partition 400 having a name and class ID for c3 404 and proceeds to activate the component c3 404.

Now consider that this component c3 404 needs to make a series of calls to components identified as "c1", "c2", and "c6", each of which require activation while c3 404 completes its operations. When component c1 is activated through call 502, the server 310 searches the default partition 400 and finds c1 403 within the same application 401. When component c2 is activated through call 503, the server searches the default partition 400 and finds c2 405 within a second application 402. Finally, when component c6 425 is activated through call 504, the server 310 searches the default partition 400 but does not find the component within the default partition 400. Therefore, the server 400 searches the base partition 420 and finds c6 425 within an application 422 on the base partition 420.

Figure 6:
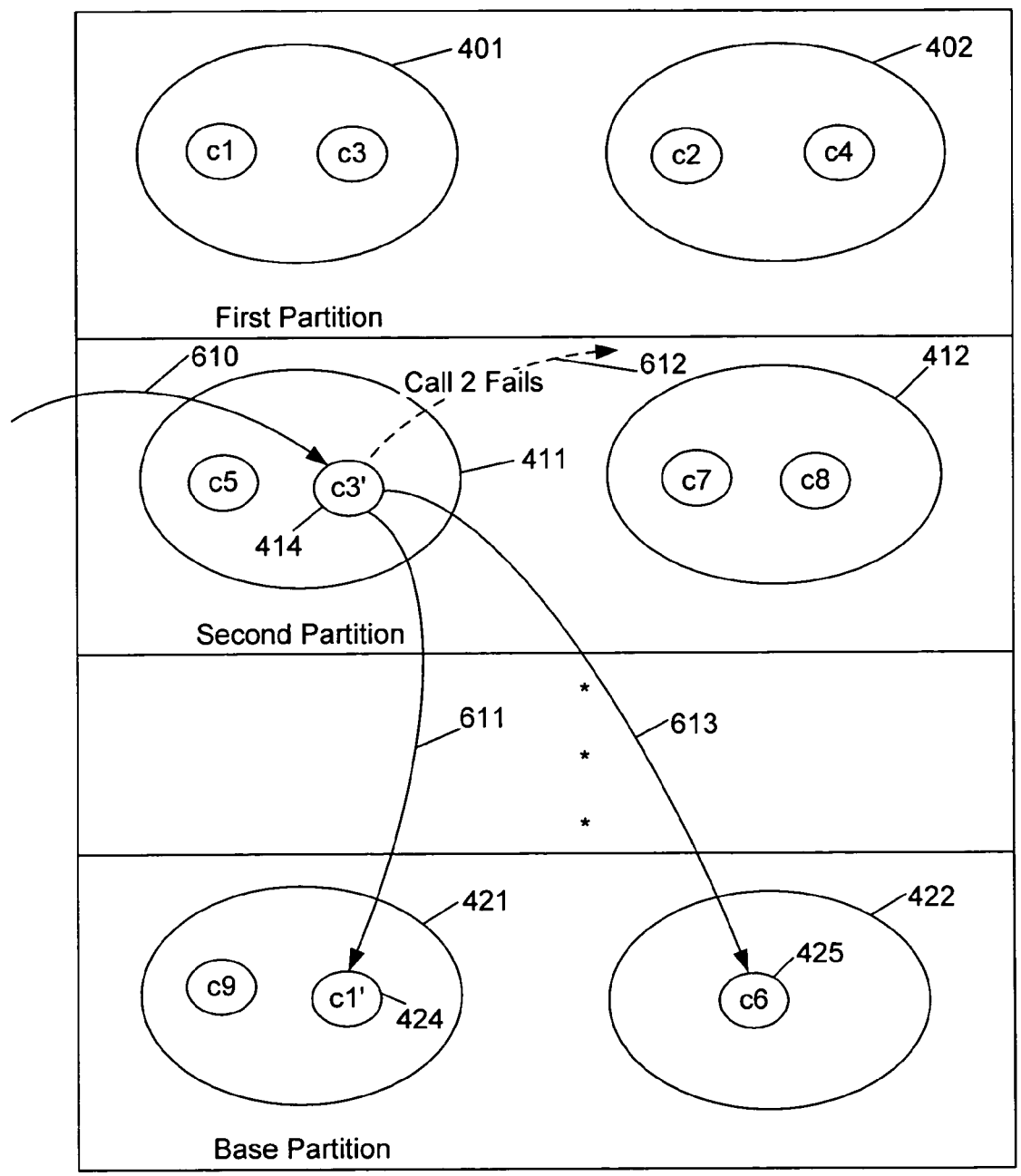
FIG. 6 illustrates a sequence of calls requiring activation of various components within a second partition set to the default partition according to another exemplary embodiment of the present invention.

FIG. 6 illustrates a sequence of calls requiring the activation of various components within a second partition set to the default partition according to another embodiment of the present invention. Now consider the same series of calls attempting to activate c3, c1, c2, and c6 for a client 301-303, FIG. 3, that has the second partition 410 for its default partition. The process begins with an incoming call 610 to activate c3 414. The server 310 determines that the second partition 410 is the default partition for this client 301-303 and searches for a component having a name and unique class ID corresponding to c3. The server 310 finds component c3' 414 and activates the component.

When component c1 is to be activated through call 611, the server 310 searches the second partition 410 but does not find the component within the second partition 410. Therefore, the server 310 searches the base partition 420 and finds c1' 424 within the application 421. When component c2 is activated through call 612, the server 310 again searches the second partition 410 but does not find the component. Again, the server 310 searches the base partition 420 but again does not find c2. As such, a call 612 to activate c2 fails. Finally, when component c6 425 is activated through call 613, the server 310 searches the second partition 410 but does not find the component c6. As in FIG. 5, the server 310 searches the base partition 420 and finds c6 425 within the application 422.

This activation processing allows different versions of an application to be resident upon the server 310 for activation and execution upon request by clients 301-303, FIG. 3, in which the particular version activated is determined by the identity of the client 301-303. Using this processing, a new version of an application may be installed upon the server while the old version remains in a different partition. Clients 301-303 will continue to access the old version of the application using a setting to their default partition to the old application. Once the new version has been tested, the server might simply change the default partition from the old version's partition to the new version's partition within a centrally located database containing the client ID/default partition information to cause the clients to now activate the new version. This change is performed in a single location, i.e., the centrally located database, and the client computing systems 301-303 do not need to be modified.

Additionally, the server might implement multiple versions of an application which permits one group of clients, such as entry-level workers, to perform one set of operations but not a second set of operations in one version of the application while also permitting a second group of clients, such as managers, to perform all of the operations. When a client attempts to activate a component to perform an operation, the identity of the client determines which partition is used, which in turn determines which set of components containing either the reduced or full set of processing functionality is used.

Figure 7:
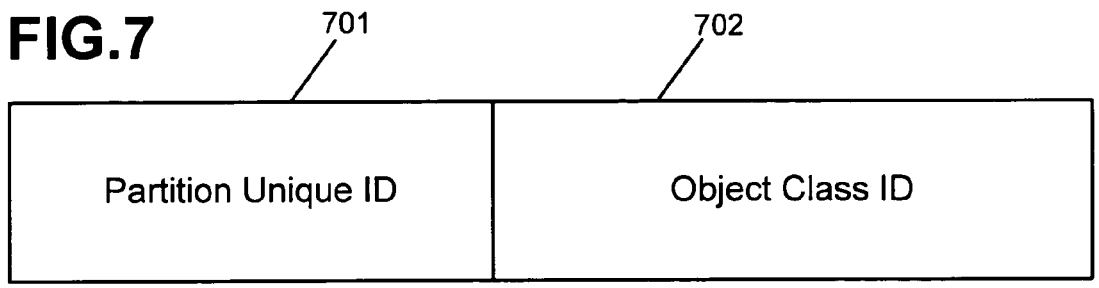
FIG. 7 illustrates a component ID for components within multiple partitions according to another exemplary embodiment of the present invention.

FIG. 7 illustrates a component ID for components within multiple partitions according to one possible embodiment of the present invention. In the past, components have been identified using a unique object class ID that uniquely identifies the component to be activated. In an exemplary embodiment, the object class ID corresponds to a 128-bit ID field.

Because a particular object class ID is no longer unique on a server 310, but rather merely unique within a given partition, component IDs must now contain both the previously unique object class ID 702 as well as a partition unique ID 701 that uniquely identifies the partition being used. When these two fields are combined, as shown in FIG. 7, a newly constructed ID for the component is created that once again uniquely identifies the component.

Figure 8:
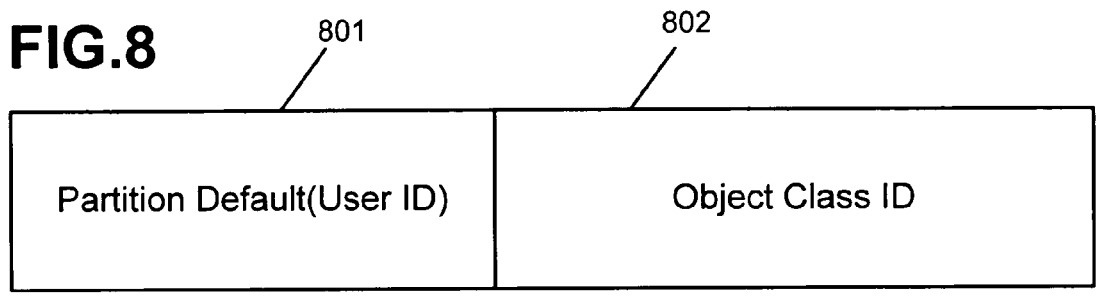
FIG. 8 illustrates a component ID for components within multiple partitions using a default partition addressing scheme according to another exemplary embodiment of the present invention.

Legacy code will continue to use just this object class ID to identify components that are to be activated. The partition unique ID will merely be provided by the server as shown in FIG. 8. New code that wishes to take advantage of the existence of the multiple partitions located on the server 310 may address the component by specifying both fields as shown in FIG. 9.

FIG. 8 illustrates a component ID for components within multiple partitions using a default partition addressing scheme according to one possible embodiment of the present invention. The partition unique ID 701 is provided by the server as a default partition 801 based upon the identity of the client requesting a component be activated. The object class ID 802 completes the reference to the component.

Figure 9:
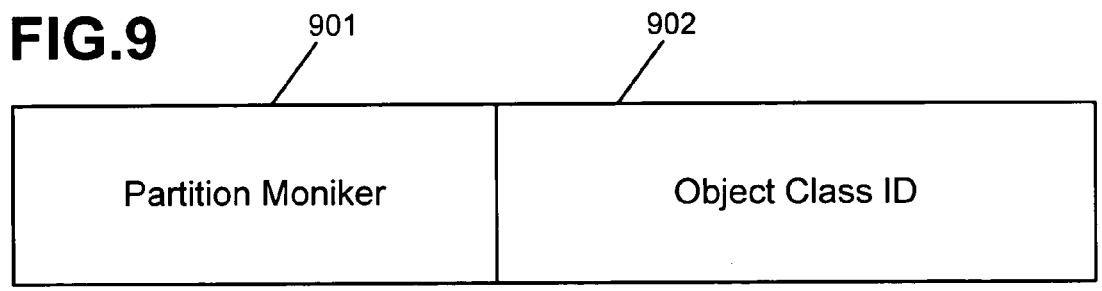
FIG. 9 illustrates a component ID for components within multiple partitions using a partition moniker addressing scheme according to another exemplary embodiment of the present invention.

FIG. 9 illustrates a component ID for components within multiple partitions using a partition moniker 901 addressing scheme according to one possible embodiment of the present invention. In contrast to FIG. 8, the identity of the partition containing the desired component is known by the process requesting the component's activation. In this case, the partition is identified using a partition moniker 901 specified by the requesting process with the object class ID 902 once again completing the reference to the component.

Figure 10:
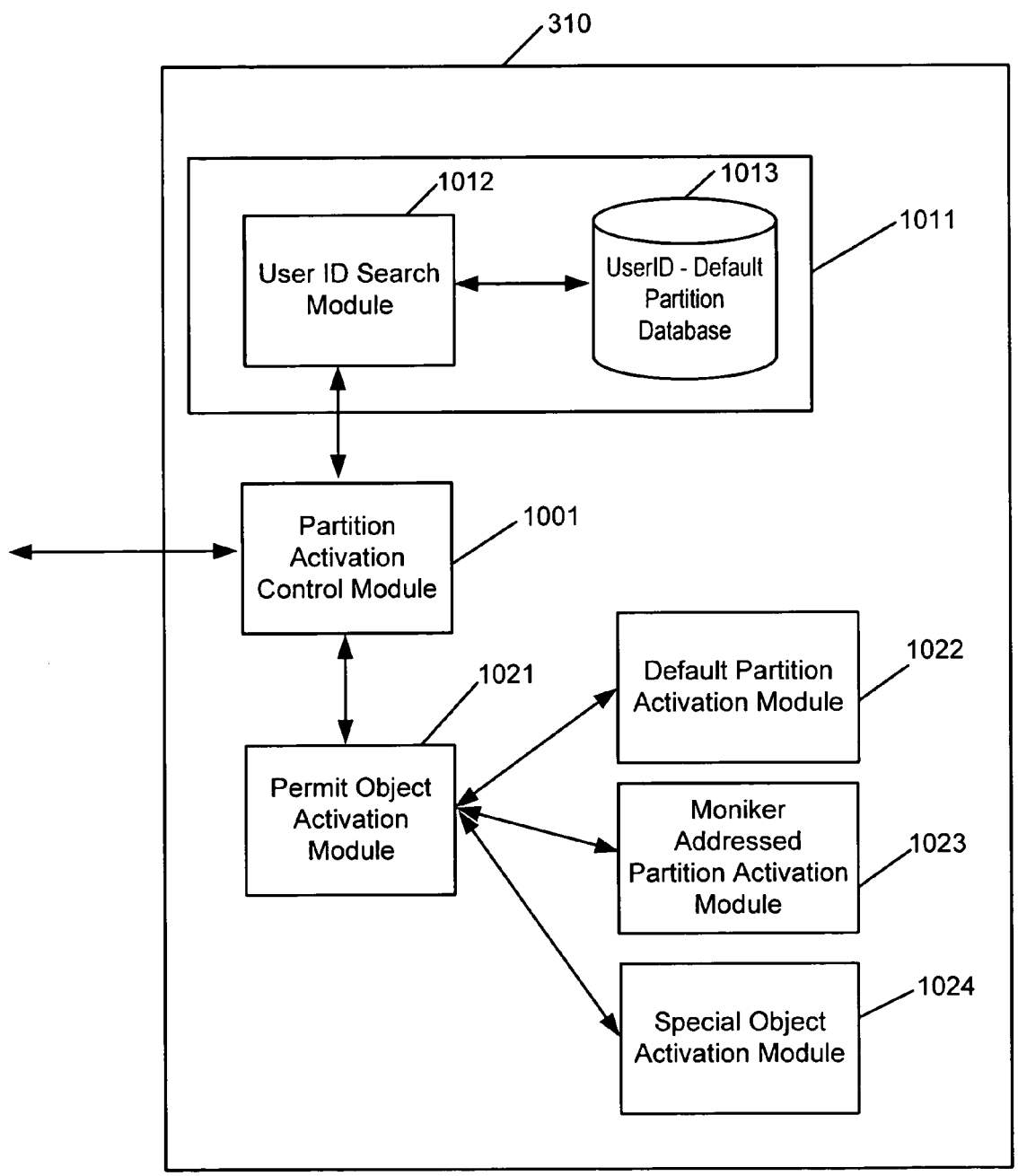
FIG. 10 illustrates a computing system for processing component activation within multiple partitions according to another exemplary embodiment of the present invention.

FIG. 10 illustrates a computing system for processing component activation within multiple partitions according to another example embodiment of the present invention. Calls that require the activation of a component are received by a partition activation control module 1001. The control module 1001 first determines the partition to be used and then activates the appropriate component.

The control module 1001 obtains the identity of the default partition from a partition identity module 1011. This module contains a user ID search module 1012 and a user ID-default partition database 1013 to determine the needed information. The user ID search module 1012 receives a request from the control module 1001 and looks up the ID of the user making the request to activate a component in the database 1013. If a match is found, the corresponding default partition ID is retrieved and returned to the control module 1001 for further processing. If no match is found, either an error or a default value is returned.

In an exemplary embodiment, a server 310 may contain only one base partition that provides a set of components to be used when a requested component is not found within the default partition. Also, the above exemplary embodiment describes using only two partitions, a default and a base partition. One skilled in the art will also recognize that the database may also produce a set of partitions to be checked or an ordered sequence of partitions to be checked to find the desired component to be activated upon location of the first matching object class ID without deviating from the scope and spirit of the present invention as recited within the attached claims.

In the exemplary embodiment, the partition identity module 1011 corresponds to a directory service typically found on networks for providing user ID based configuration and security data. The partition identity module 1011 is typically a centrally located data store that provides the requested information upon request. One skilled in the art will recognize that this database might be located anywhere in the computing system so long as it provides the information needed by the present invention as recited within the attached claims.

The control module 1001 uses the returned information to cause a permit object activation module 1021 to activate an instance of the requested component. The activation module 1021 uses a default partition activation module 1022 to activate an instance of a component using the default partition ID provided by the partition identity module 1011. The activation module 1021 uses a moniker addressed partition activation module 1023 to activate an instance of a component using a partition moniker to specify the partition ID to be used. Finally, The activation module 1021 uses a special object activation module 1024 to activate an instance of a component using any other process such as component aliases, public/private components, and any other type of component activation processing desired.

Figure 11:
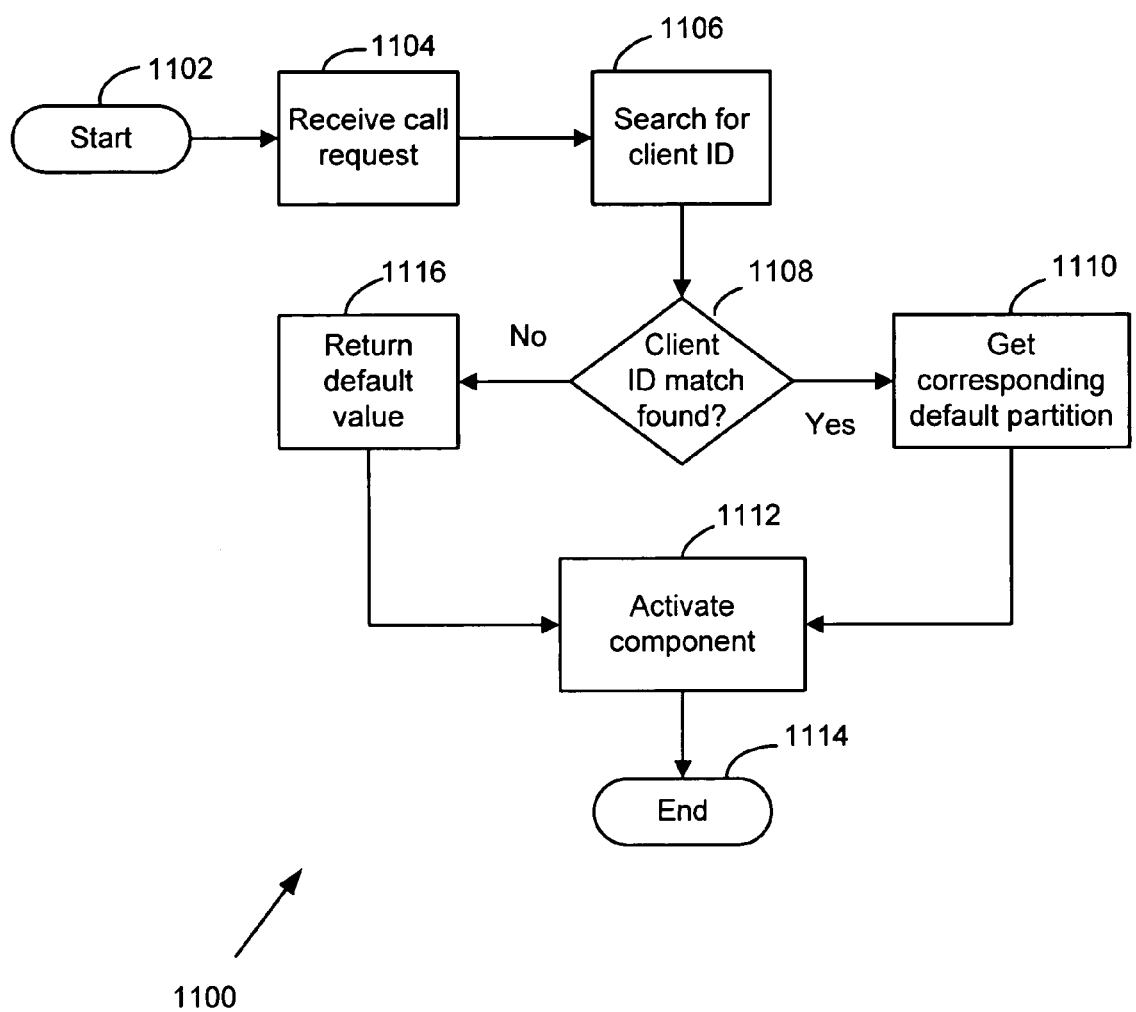
FIG. 11 is a process flow diagram illustrating the logical operations of associating a user ID with a partition according to another exemplary embodiment of the present invention.

FIG. 11 illustrates a process flow diagram representing the processing performed as part of component activation within multiple partitions according to yet another example embodiment of the present invention. Operational flow begins at start point 1102. A receive operation 1104 receives a call request to activate a component from a client, such as client 301 of FIG. 3. A search operation 1106 searches for the client ID, typically in a database of client Ids, for example, the default partition database 1013 of FIG. 10. A match module 1108 detects if a match for the client ID can be found in the database. If the match module 1108 detects a match for the client ID, operational flow branches "YES" to a get operation 1110. The get operation 1110 gets the corresponding default partition ID for the client ID. The activate operation 1112 activates the component in accordance with the operational flow described in conjunction with FIG. 12. Operational flow ends at termination point 1114.

If the match module 1108 detects that there is not a match for the client ID in the database, operational flow branches "NO" to a return operation 1116. The return operation 1116 returns a default value for a default partition. It is noted that the return module 1116 might return a base partition to be used. In alternative embodiments, if the client ID is not found in the database, the request might fail or access might be denied to the client. The activate operation 1112 activates the component in accordance with the operational flow described in conjunction with FIG. 12. Operational flow ends at termination point 1114.

Figure 12:
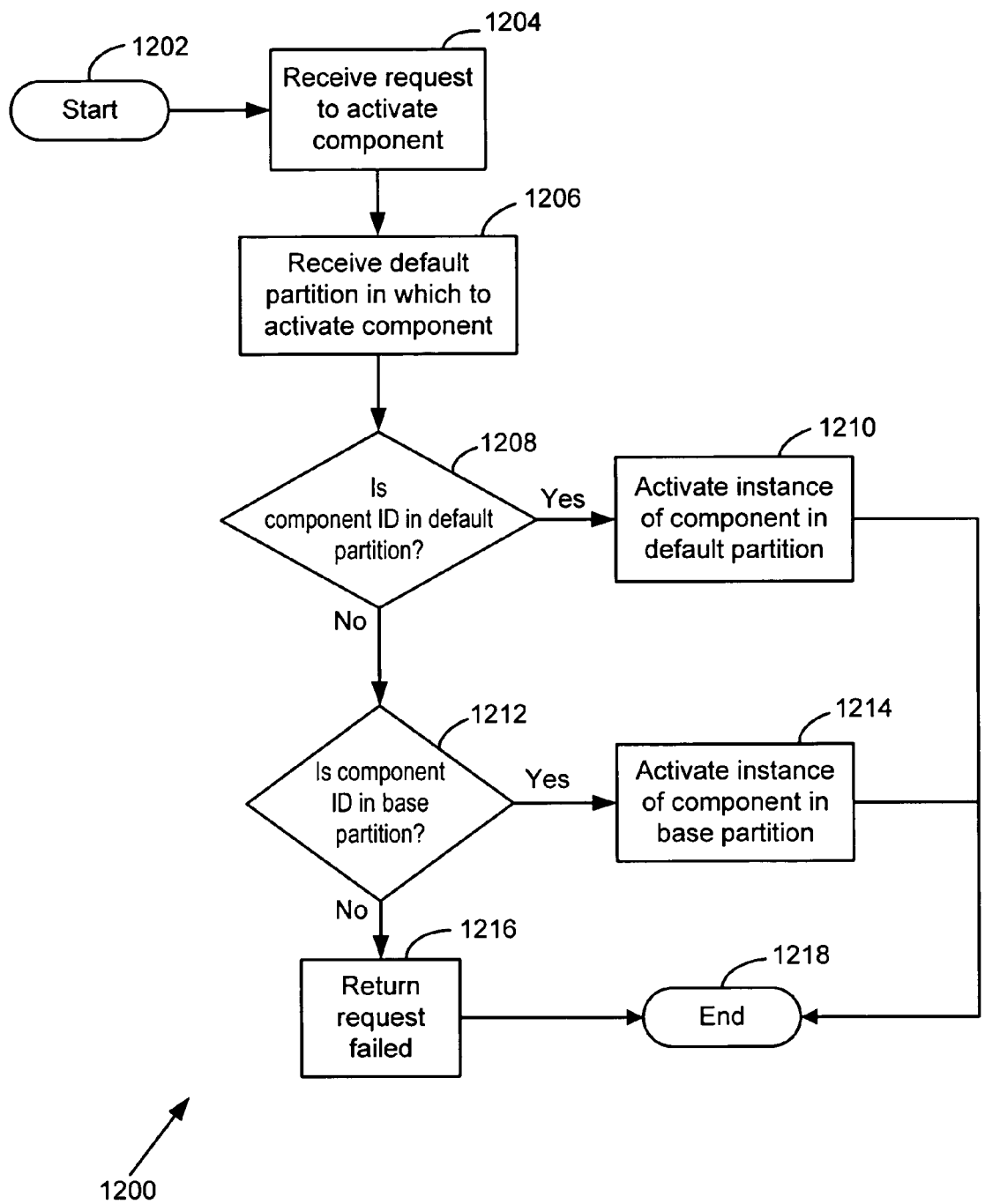
FIG. 12 is a process flow diagram illustrating the logical operations of component activation within multiple partitions according to another exemplary embodiment of the present invention.

FIG. 12 illustrates a process flow diagram representing the processing performed as part of component activation within multiple partitions according to yet another example embodiment of the present invention. Operational flow begins at start point 1202. A receive operation 1204 receives a request, for example, request 1112 of FIG. 11, to activate a component. A default operation 1206 receives a default partition in which to activate the component. A default module 1208 detects if the component ID is in the default partition. If the default module 1208 detects the component ID is in the default partition, operational flow branches "YES" to an activate operation 1210. The activate operation 1210 activates an instance of the component in the default partition, for example, default partition 400 of FIG. 5. Operational flow ends at termination point 1218.

If the default module 1208 detects that the component ID is not in the default partition, operational flow branches "NO" to a base module 1212. The base module 1212 detects if the component ID is in the base partition, for example, base partition 420 of FIG. 5. If the base module 1212 detects that the component ID is in the base partition, operational flow branches "YES" to an activate operation 1214. The activate operation 1214 activates an instance of the component in the base partition. Operational flow ends at termination point 1218.

If the base module 1212 detects that the component ID is not in the base partition, operational flow branches "NO" to a return operation 1216. The return operation 1216 returns a request failed. Operational flow ends at termination point 1218.

The operational flow charts depicted in FIGS. 11 and 12 may best be understood in terms of application examples. Referring to FIGS. 3, 5, 10, and 11, in a first application example, operational flow begins at start point 1102. A client 301 requests activation of a component c3 404 in a first application 401. The receive operation 1104 receives the request to activate the component c3 404. The search operation 1106 searches for the client Id 301 in the default partition database 1013.

The match module 1108 detects that a match has been found for the client ID 301, and operational flow branches "YES" to the get operation 1110. The get operation 1110 gets the corresponding default partition, the first partition 400, for the client 301. The activate component operation 1112 activates the component c3 404 in accordance with the operational flow illustrated in FIG. 12.

Referring now to FIG. 12 for the activation of component c3 404, the receive operation 1204 receives a request to activate the component c3 404. The default operation 1206 receives the default partition 400 for the client 301 making the request. The default module 1208 detects that the component c3 404 is in the first partition 400, and operational flow branches "YES" to the activate operation 1210. The activate operation 1210 activates component c3 404, and operational flow ends at termination point 1218.

In a second application example, component c3 404 requests activation of component c1 403. The receive operation 1204 receives the request to activate component c1 403. The default operation 1206 receives the default partition 400 in which to activate the component c1 403. The default module 1208 detects that the component c1 403 is in the default partition 400, and operational flow branches "YES" to the activate operation 1210. The activate operation 1210 activates the component c1 403, and operational flow ends at termination point 1218.

In another application example, component c3 404 requests activation of component c6 425. Operational flow proceeds as described above to the default module 1208. The default module 1208 detects that the component c6 425 is not in the default partition 400, and operational flow branches "NO" to the base module 1212. The base module 1212 detects that the component is in the base partition 420, and operational flow branches "YES" to the activate operation 1214. The activate operation 1214 activates the component c6 425 in the base partition 420, and operational flow ends at termination point 1218.

In another application example, referring to FIG. 6, component c3' 414 request activation of c2. Operational flow proceeds as described above to the base module 1212. The base module 1212 detects that the component c3' 414 is not in the base module 1212, and operational flow branches "NO" to the return operation 1216. The return operation 1216 returns a request failed message, and operational flow ends at termination point 1218.

In another application example, a client 302 request activation of component c3. referring to FIG. 11, operational flow proceeds to the match module 1108 as previously described. The match module 1108 detects that the client 302 is not in the default partition database, and operational flow branches "NO" to the return operation 1116. The return operation 1116 returns a default value for a default partition, for example, partition 410, FIG. 4. Alternatively, the client could be denied access to the software application. The activate operation 1112 activates the component as previously described. Operational flow ends at termination point 1114.

Figure 13:
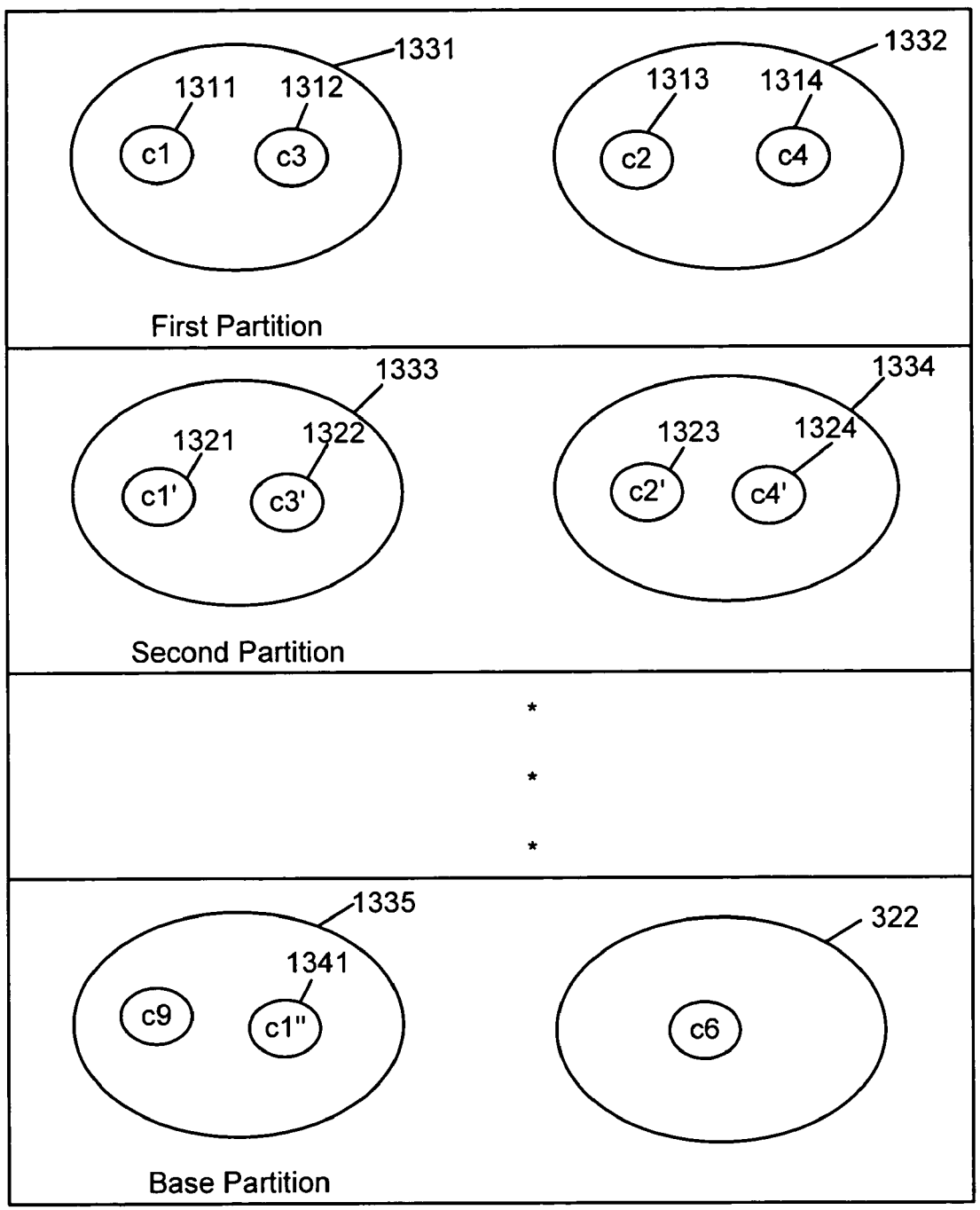
FIG. 13 illustrates a set of programmable components including component aliases according to another exemplary embodiment of the present invention.

FIG. 13 illustrates a set of programmable components including component aliases according to one embodiment of the present invention. A computing system having a first partition, a second partition, and a base partition are disclosed. In the first partition, four components, c1 1311, c2 1312, c3 1313, and c4 1314 are shown within two different applications 1331-1332. These four components represent four actual components that reference the physical class objects c1-c4.

The second partition, in contrast, also discloses four components, c1' 1321, c2' 1322, c3' 1323, and c4' 1324 that each represent four component aliases that also reference the physical class objects c1-c4. For these four component objects, a separate set of component properties are maintained for the aliases within the system component catalog while the class object that is actually instantiated is corresponding the physical class c1-c4. For completeness, a base partition is also shown that contains three component objects, one of which, c1" 1331, is also an alias component that references the physical class object.

While these examples illustrate the component aliases being located within multiple partitions on a multi-partition computing system, one skilled in the art will recognize that component aliases as recited within the attached claims permits component object aliases to be used within a single partition in addition to multiple partitions and will also recognize that component aliases may be used within computing systems that maintain only a single partition without deviating from the spirit and scope of the claimed invention as recited within the attached claims.

Figure 14:
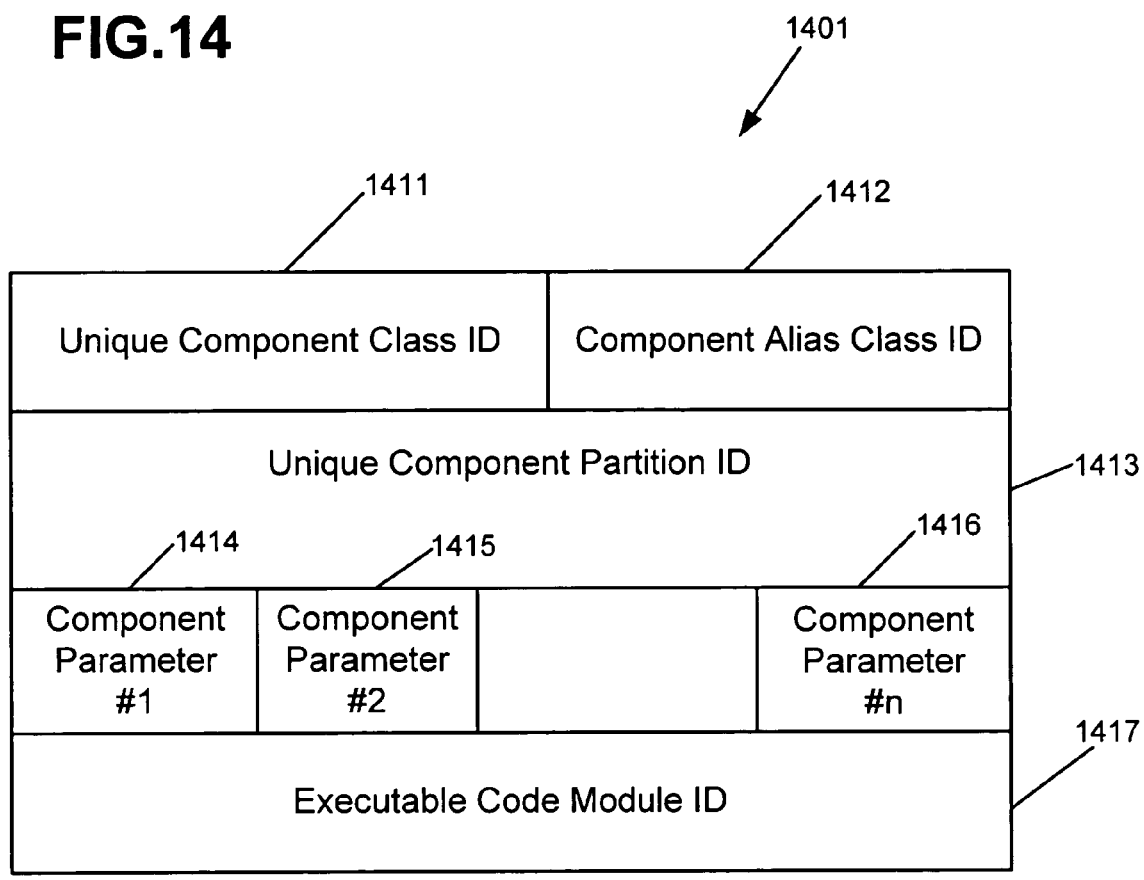
FIG. 14 illustrates a catalog entry for a programmable component and component alias according to another exemplary embodiment of the present invention.

FIG. 14 illustrates a catalog entry for a programmable component and component alias according to yet another example embodiment of the present invention. In order to maintain the logical and physical separation between logical component objects component object aliases and their corresponding physical class objects, a system component catalog is used to maintain data necessary to bind these objects together. Every logical component object will maintain a catalog entry within the catalog database in order to bind the logical object to a physical class for execution.

The catalog entry 1401 has a set of data fields, the first two of which are a Component Alias Class ID 1414 and a Unique Component Class ID 1412. The Class ID 1414 corresponds to a class ID used to specify the logical reference to the class ID corresponding to this catalog entry. The Unique Component Class ID 1412 corresponds to a class ID used to specify the physical class ID for the component to be executed when the logical class ID is to be activated. In this particular embodiment, a component object alias is distinguished from an actual component object when these two fields contain references to different class IDs. When the two fields contain the same class ID, the corresponding component object is not an alias. When the two fields do not contain the same class ID, the corresponding component object is a component object alias where the alias is between the alias class ID and its properties and the actual component object class.

One skilled in the art will recognize that other schemes to specify an alias may be used without deviating from the claimed invention as recited within the attached claims. For example, a component object that is not an alias may store a <null> value within the Component Alias Class ID field 1412 rather than the same class ID value found within the Unique Component Class ID field 1414. Similarly, the catalog entry 1401 may expressly maintain a single bit field to indicate whether the component object corresponds to an alias or not. All of these implementation details are within the design options and choices made by one skilled in the art when optimizing the system performance for a particular operating environment.

The catalog entry 1401 also contains a field 1413 that specifies a Unique Component Partition ID in the systems that maintain and utilize multiple partitions as discussed above. The catalog entry 1401 contains a set of one or more component parameters 1414-1416 that are used to specify the run-time operation of the component object. When an alias is created, these values are originally copied from the values maintained for the component object class. These parameter values 1414-1416 are then modified as desired to distinguish the operation of the component object alias from the component object itself. Finally, the catalog entry 1401 includes a field that specifies the Executable Code Module ID that corresponds to the physical reference to the module that contains executable code that is to be used when an instance of the component object is activated.

Figure 15:
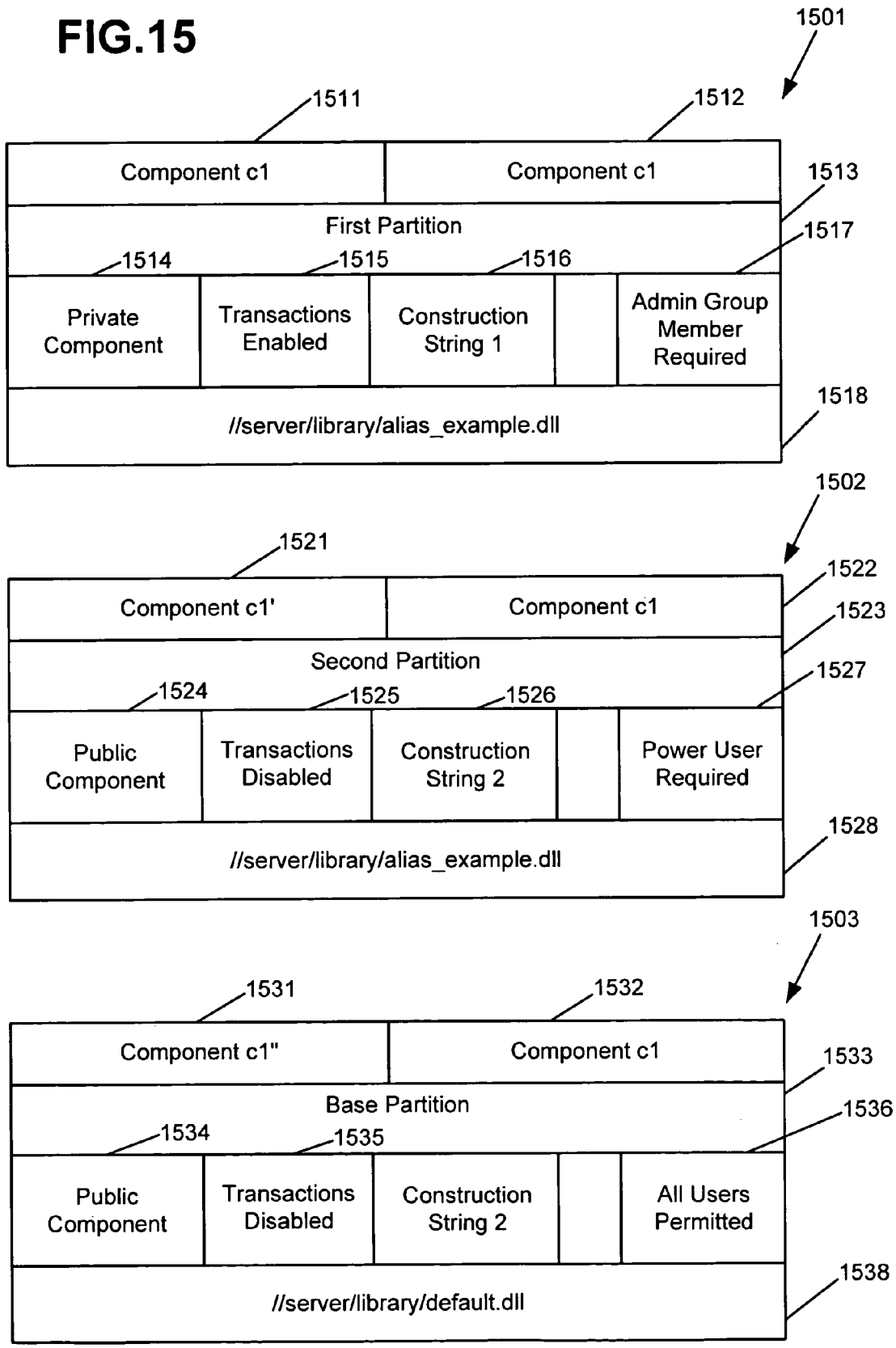
FIG. 15 illustrates a set of catalog entries for a programmable component and two component aliases according to another exemplary embodiment of the present invention.

FIG. 15 illustrates a set catalog entries for a programmable component and two component aliases according to yet another example embodiment of the present invention. The first of the three catalog entries 1501 corresponds to a catalog entry for a component object c1. This object is not a component object alias as the unique component class ID field 1511 and the component alias class ID field 1515 both contain references to component class c1. This component object is located within a first partition as indicated within the unique component partition ID field 1513.

Four different component parameters 1514-1517 are shown for this catalog entry 1501. First, the component object is specified to be a private component 1514. Private components correspond to components that may only be activated by a component located within the same partition as the component to be activated. These types of components are distinguished from public components which may be activated by any other component.

The second parameter field 1515 contains a parameter specifying that this instance of a component is to use transactions when executed. Within computing systems, such as one that implements the MICROSOFT COM+ run-time operating environment, many such operating parameters are set for a component and implemented at run-time by the system itself. Typically these settings are either enabled or disabled and the parameters maintained within this field indicate which of these parameters are enabled.

The next parameter 1516 in the catalog entry 1501 contains a construction string that is passed to a component object activator for use when an instance of the component object is activated. This construction string permits a set of configuration data to be passed to the component object for use in a particular instance of the object that may wish to be different a other times. For example, the construction string may contain a reference to the IP address or URL to a data store, or database, that is to be used when a particular component establishes a connection between the component and the database. In such a case, a component is typically used to establish and initialize the connection to the database. This component may be identical for all instances of establishing a connection to a given type of database except for the unique reference to the particular database in question. A single component may be used to establish such a connection and an alias be used to establish a connection to given database. The identity of the desired database may be stored within the construction string field 1516 which is passed to the component when activated. The component may use this string to determine the identity of the desired database at run-time using this reference. Any configuration data may be maintained and passed to a component object using this construction string.

The final parameter 1517 illustrated within the catalog entry 1501 contains a reference to the administrative authority needed by the user ID requesting that the component be activated. In this example, a user ID for the component requesting the component activation must be a member of an administrator group. This example uses the types of administrative user groups which may be typically found for user IDs in directory services. Any such of organization of users ID, and similar system security settings, may be used in this operation without deviating from the spirit and scope of the present invention as recited within the attached claims.

The final field 1518 illustrated within the catalog entry 1501 is a reference to a dynamically linked library that contains the executable class object to be used when an instance of the component object is activated. This example field 1518 contains an explicit reference to the .dll file stored on a server that is part of the computing system. Other references to this module may be used without deviating from the spirit and scope of the present invention.

The second catalog entry 1502 for component object alias c1' possesses all of the above fields that are used to specify a particular instance of component object c1. The component object is an alias as the first two fields contain a reference to component ID c1' 1521 and c1 1522. In contrast to the example within catalog entry 1501, the component parameters specify this instance to be a public component 1524, specify that transactions are not used 1525, specify a different construction string 1526, and specify that power users 1527 rather than administrators may activate the component object. Finally, the component object catalog entry 1502 specifies that the same .dll file 1528 is used for activating an instance of the component object.

A second component object alias catalog entry 1503 illustrates a second instance of an alias for component c1. This component object alias corresponds to a component object alias within a base partition 1533 and possesses the same parameters 1534-1536 as the prior component object catalog entry 1502 except that all users 1536 may activate this component. Most significantly however, this component object uses a different .dll file 1538 to specify the location of the executable component class used to implement this component object alias. Using these constructs, a component alias may completely change the operating parameters as well as the object class for a given reference to a component. When these features are combined with the use of references to components within different partitions based upon the identity of the user making a request, a client process for two different users may attempt to activate what is logically referenced as the same component object but actually cause two completely different component objects to be activated in which all run-time parameters may be different.

Figure 16:
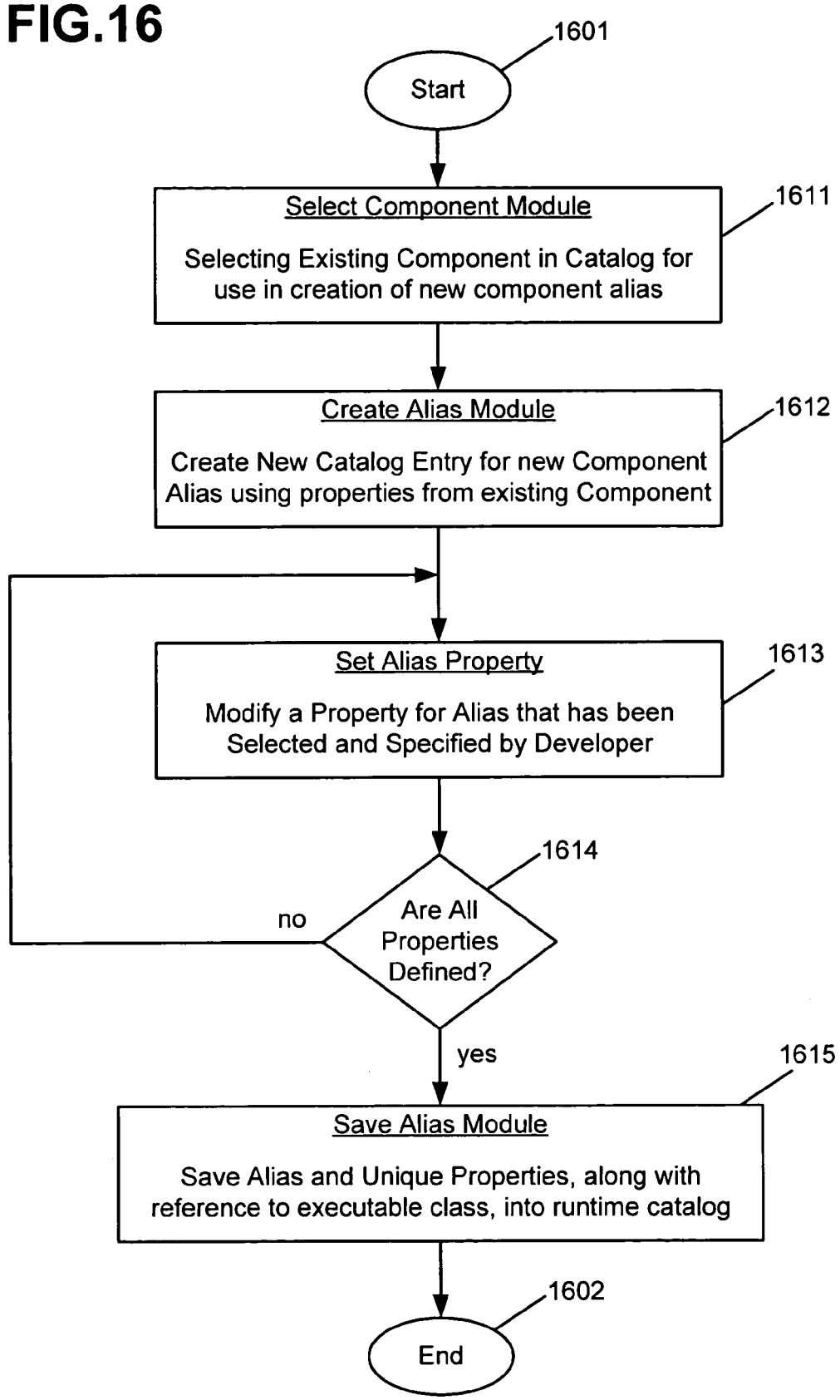
FIG. 16 illustrates a process flow diagram representing the processing performed as part of component alias creation according to another exemplary embodiment of the present invention.

FIG. 16 illustrates a process flow diagram representing the processing performed as part of component alias creation according to yet another example embodiment of the present invention. The processing starts 1601 and a select component module 1611 is used to select an existing component that exists within the system catalog of components for use in creating an component object alias. Next, a create alias module 1612 creates a new component catalog entry and places the parameter values within the catalog entry based upon the values stored in the catalog entry for the selected component object. Once the alias catalog entry is created, the values for the parameters are modified to specify the desired alias.

A processing loop created using a set alias property module 1616 and test module 1614 permits these parameters to be modified one at a time until the desired component object alias has been specified. At that time, test module 1614 terminates the operation of the processing loop and a save alias module 1615 stored the updated catalog entry into the system catalog database for use at run-time and the processing ends.

Figure 17:
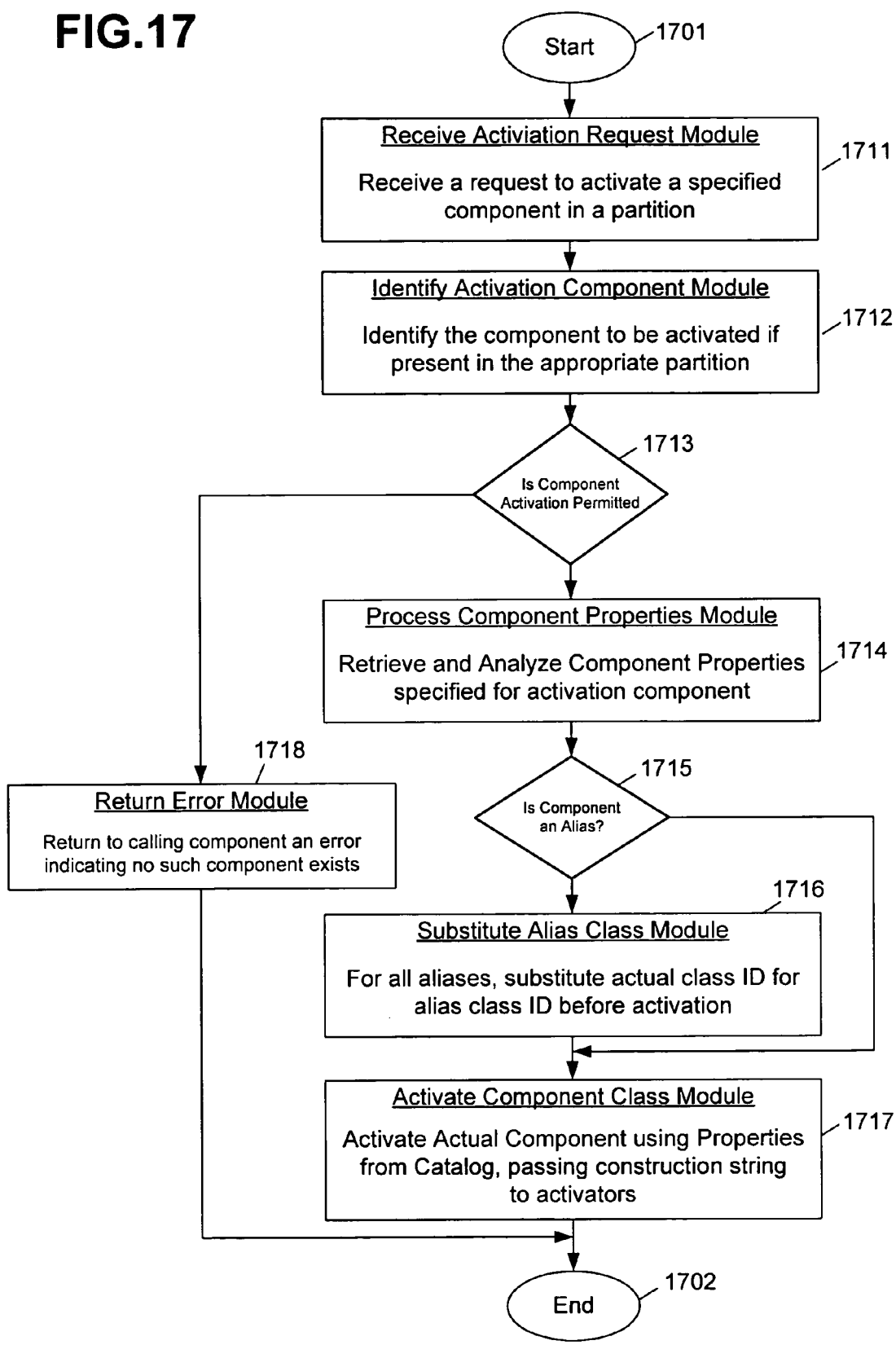
FIG. 17 illustrates a process flow diagram representing the processing performed as part of component activation using programmable components and component aliases within multiple partitions according to another exemplary embodiment of the present invention.

FIG. 17 illustrates a process flow diagram representing the processing performed as part of component activation using programmable components and component aliases within multiple partitions according to yet another example embodiment of the present invention. The process begins 1701 and a receive activation request module 1711 receives a request from a component to activate an instance of a specified component object. Once the request has been received, an identify activation component module 1712 processes the request to determine the identify of the specified component object and to determine if the specified component may be activated. This module will perform the processing associated with default and base partitions, partition monikers, and any security related activation testing that is needed to determine if a particular request to activate a component object is to be performed.

Test module 1713 determines if the requested component object is to be activated. If the test is that the component object is not to be activated, a return error module 1718 generates and returns an appropriate error message that no such component object exists and the processing ends 1702. If test module 1713 determines that the component may be activated, a process component properties module 1717 retrieves the component object properties for the requested component object using the unique component class ID. This module performs any security and other activation processing based upon the parameters valued found within catalog entry for the requested component object.

If all of the parameters are successfully processed, test module 1715 determines if the requested component object refers to a component object alias. If the requested component object is an alias, substitute alias class module 1716 substitutes the actual component class ID stored in the component alias class ID field for the unique component class ID. The requested component is activated by an activate component class module 1716 using the executable module referenced in the executable code module ID field of the catalog entry and the processing ends.

Figure 18:
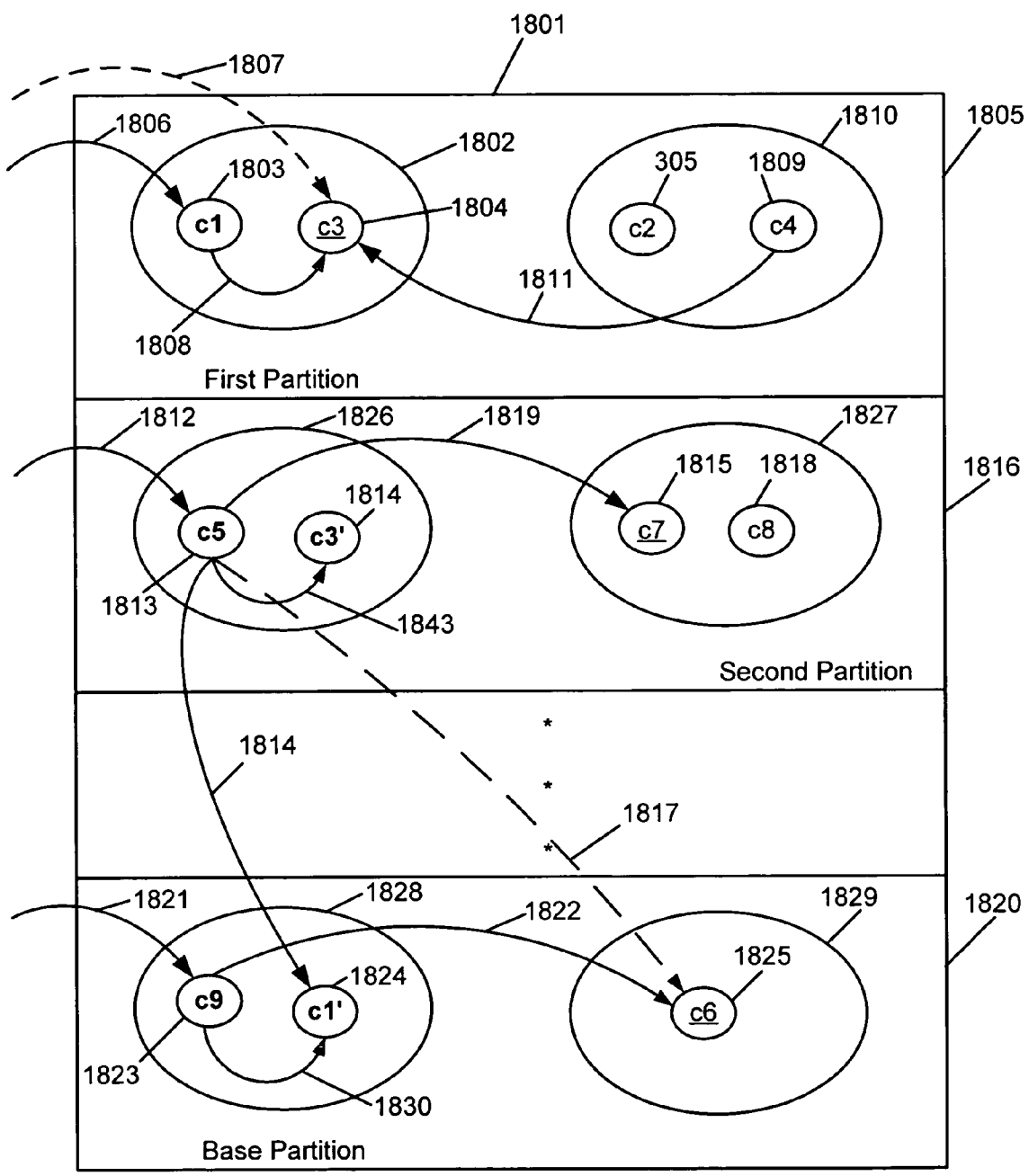
FIG. 18 illustrates a sequence of calls requiring activation of various components within a partitions set to a default partitions using public and private components according to another exemplary embodiment of the present invention.

FIG. 18 illustrates a sequence of calls requiring activation of various components within a partition that is the default partition using public and private components according to one embodiment of the present invention. First consider two activation calls made from outside server 1801 to components c1 1803 and c3 1804 within application 1802 in the default partition 1805. In this example, component c1 1803 is configured to be a public component and component c3 1804 is configured to be a private component. These properties of the components are specified using configuration data accessed when the component is activated and used by the server 1801 to determine if a component may be activated. In FIG. 18, public components, such as c1 1803, are designated in BOLD text and private components, such as c3 1804, are designated in UNDERLINED text.

Component c1 1803, being a public component may be activated by a call initiated by a remote component 1806. When a component is designated as a public component, the component may be activated by a component located within any other partition whether the partition is located on server 1801 or any other remote computing system. The component may, if desired, impose other security checks to determine whether the component may be activated. These additional security checks may be based upon ownership of the component, membership within an authorized group or user ID, or similar security protocols typically used to grant and deny access to a computer resource.

In contrast, a private component, such as c3 1804, may only be activated by a call initiated by a component within the same application 1805. An external call 1807 attempting to activate component c3 1804 will fail. Component c3 1804 may only be activated by a call 1805 initiated within its application 1805. This call 1808 may be initiated by a component c1 1803 within the same application 1802.

Similarly, an external call 1812 initiating activation of component c5 1813 is successful if component c5 1813 is a public component. Component c5 1813 may initiate calls to activate component c3' 1814 and component c7 1815 since all of these components are within a second partition 1816. For the same reasoning discussed above, component c3 1814 may also be activated by an external call and component c7 1815 may only be activated by a call originating in the second partition 1816.

As discussed above, component c5 1813 may activate components in other partitions using either a default/base partition addressing or a partition moniker. When component c5 1813 attempts to activate component c1, the version of component c1 1824 in the base partition 1820 will be used. This activation call 1814 is successful as component c1' 1824 is a public component. In contrast, an activation call 1817 to component c6 1825 fails as component c6 1825 in the base partition 1820 is a private component not in the same application as calling component c5 1813.

Finally, an external activation call 1821 to component c9 1823, which is a public component, is successful when component c9 1823 is in the base partition 1820. As before, the external activation call 1821 fails if c9 1823 is a private component. In this example, component c9 1823 may initiate successful activation calls 1822-1823 to any component within the base partition 1820.

Figure 19:
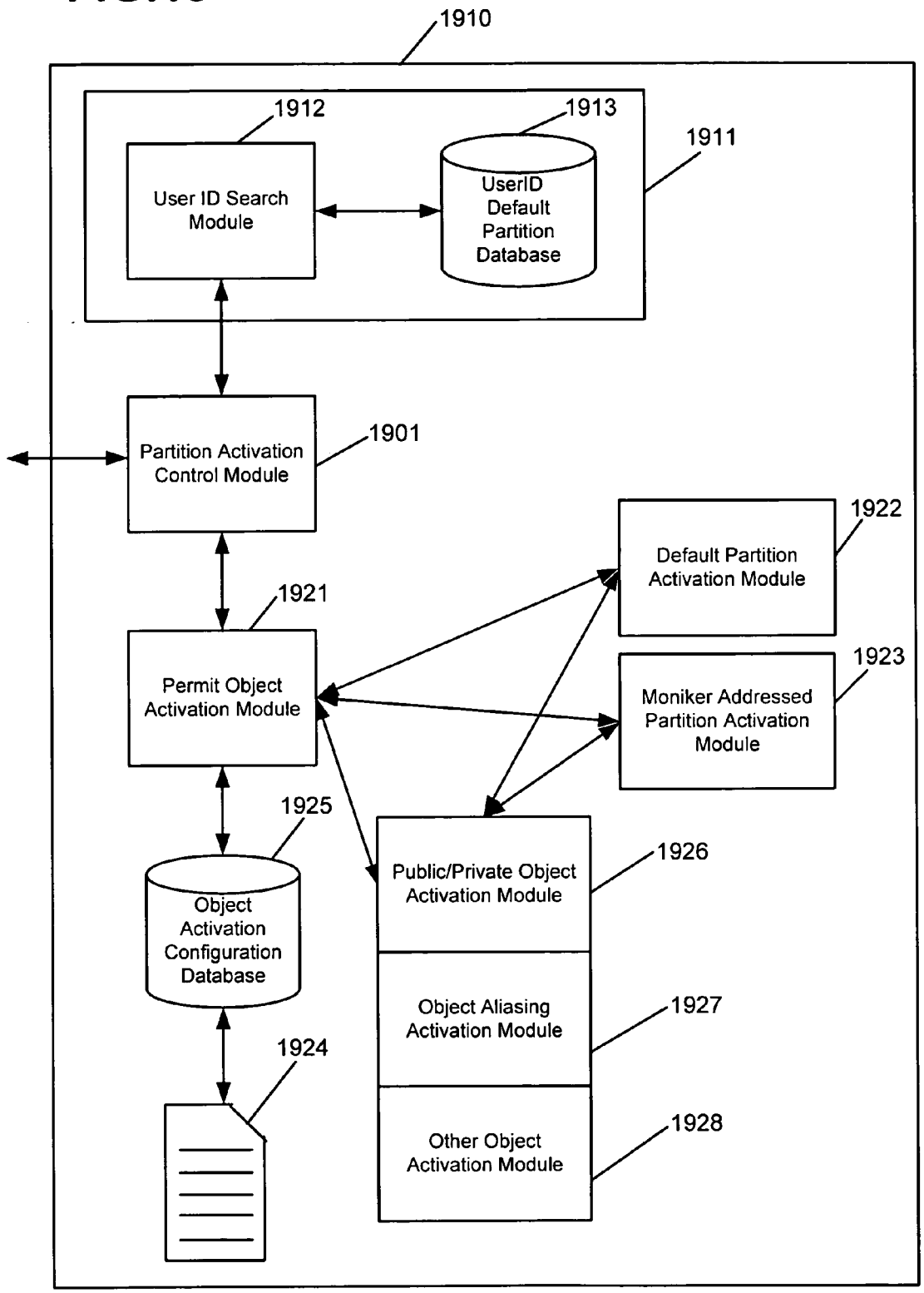
FIG. 19 illustrates a computing system for processing component activation using public and private components within multiple partitions according to another exemplary embodiment of the present invention.

FIG. 19 illustrates a computing system for processing component activation using public and private components within multiple partitions according to yet another example embodiment of the present invention. Calls that require the activation of a component are received by a partition activation control module 1901. The control module 1901 first determines the partition to be used and then activates the appropriate component.

The control module 1901 obtains the identity of the default partition and the identity of the base partition from a partition identity module 1911. This module contains a user ID search module 1912 and a user ID-default partition database 1913 to determine the needed information. The user ID search module 1912 receives a request from the control module 1901 and looks up the ID of the user making the request to activate a component in the database 1913. If a match is found, the corresponding default partition ID is retrieved and returned to the control module 1901 for further processing. If no match is found, either an error or a default value is returned.

In another embodiment, a server 1910 may contain only one base partition which provides a set of components to be used when a requested component is not found within the default partition. Also, the above embodiment describes using only two partitions, a default and a base partition. One skilled in the art will again recognize that the database may also produce a set of partitions to be checked or an ordered sequence of partitions to be checked to find the desired component to be activated upon location of the first matching object class ID without deviating from the scope and spirit of the present invention as recited within the attached claims.

In the above embodiment, the partition identity module 1911 corresponds to a directory service typically found on networks for providing user ID based configuration and security data. The partition identity module 1911 is typically a centrally located data store that provides the requested information upon request. One skilled in the art will recognize that this database may be located anywhere in the computing system so long as it provides the information needed by the present invention as recited within the attached claims.

Figure 20:
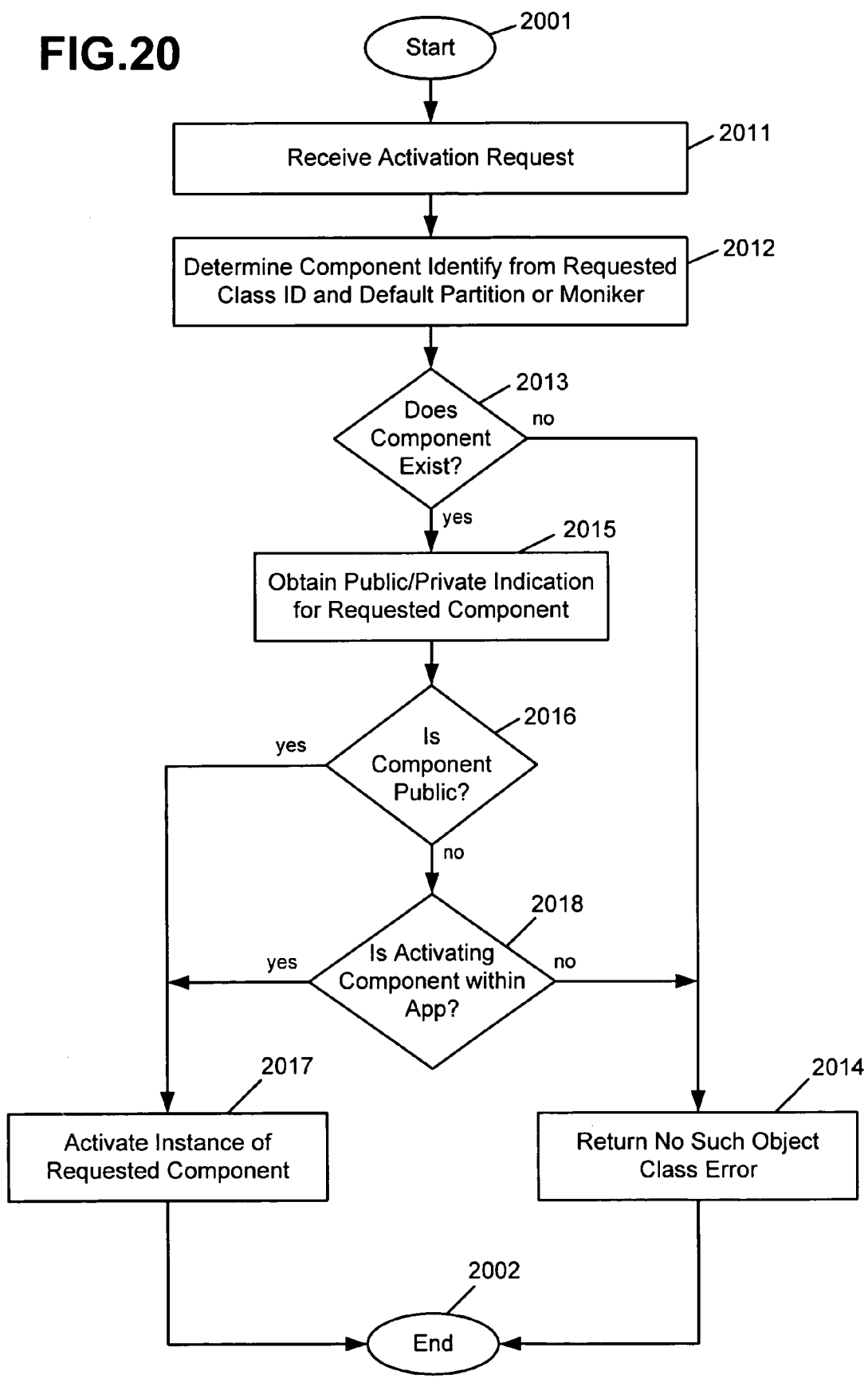
FIG. 20 illustrates a process flow diagram representing the processing performed as part of component activation using public and private components within multiple partitions according to another exemplary embodiment of the present invention.

The control module 1901 uses the returned information to cause a permit object activation module 1921 to activate an instance of the requested component. The activation module 1921 uses a default partition activation module 1922 to activate an instance of a component using the default partition ID provided by the partition identity module 1911. The permit object activation module 1921 uses a moniker addressed partition activation module 1923 to activate an instance of a component using a partition moniker to specify the partition ID to be used. Finally, the activation module 1921 retrieves a configuration data record 1924 from an Object Activation Configuration database 1925 to determine if the activation of the object requires the use of one or more activators 1926-1928 to activate an instance of a component using a process such as component aliases, public/private components, and any other type of component activation processing desired. The decision to successfully activate a public and private component as discussed above is performed by a public/private activation module 1926. Other activation modules 1927-1928 perform any required processing to implement their respective functions. FIG. 20 illustrates a process flow diagram representing the processing performed as part of component activation using public and private components within multiple partitions according to yet another example embodiment of the present invention. The process flow begins 2001 as the process proceeds to a receive activation request module 2011. The receive module 2011 receives an activation request from a calling component that seeks to activate a non-active component within the server 1910, FIG. 19.

Once the request is received, the process, in module 2012, determines the identity of the component to be activated from the identity of the requested class ID using the default partition corresponding to the identity of the calling component and any partition moniker that is part of the activation request. Test module 2013 determines if the corresponding component exists. This test uses the component identified within the default partition, and if not present there, the base partition unless a partition moniker is used. If the requested component does not test, the processing proceeds to an error module 2014 to generate and return a no such object class error message to the calling component before the process ends 2002.

If test module 2013 determines that the requested component exists, the processing obtains the public/private indication data for the requested component in module 2015. Test module 2016 uses the data obtained in module 2015 to determine if the requested component is a public component. If test module 2016 determines that the requested component is a public component, an instance of the component is activated by module 2017 and the process ends 2002.

If test module 2016 determines that the requested component is a private component, test module 2018 determines if the calling component is within the same application as the requested component. If test module 2018 determines that the requested component is within the same application, an instance of the component is activated by module 2017 and the process ends 2002. If test module 2018 determines that the requested component is not within the same application, an error message is generated by error module 2014 before the process ends.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of activating a component in a computing system having a plurality of partitions, the method comprising:
    receiving a request to activate a component having an object class ID from a client computing system having a client ID, wherein the client ID identifies the client computing system;
    mapping the client ID to a partition corresponding to the client ID;
    detecting if the object class ID is contained within a default partition corresponding to the partition;
    if the object class ID is contained within the default partition, activating an instance of the component in the partition;
    if the object class ID is not contained within the default partition, detecting if the object class ID is contained within a base partition;
    if the object class ID is contained in the base partition, activating an instance of the component in the base partition; and
    forming a component ID that uniquely identifies the component across all of the plurality of partitions of the computing system, the component ID including the object class ID, and a partition ID provided either by the client computing system in the request, or by the computing system if not provided by the client computing system in the request.

2. A method according to claim 1, further comprising:
    if the object class ID is not contained in the base partition, returning a fail message.

3. A method according to claim 1, wherein:
    mapping the client ID includes searching for a client ID in a database.

4. A method according to claim 3, wherein:
    mapping includes detecting if the client ID exists in the database.

5. A method according to claim 4, wherein:
    mapping includes if the client ID does not exist in the database mapping to a default value for a default partition.

6. A method according to claim 4, wherein:
    mapping includes if the client ID does not exist in the database returning a fail message.

7. A method according to claim 1, wherein:
    receiving a request includes receiving a request to activate a second component having an object class ID and a partition from a first component.

8. A system for activating a component in a computing system having a plurality of partitions, the system comprising:
    a computer storage medium;
    a receive module that receives a request to activate a component having an object class ID from a client computing system having a client ID, wherein the client ID identifies the client computing system;
    a get module that maps the client ID to a partition corresponding to the client ID;
    a default module that detects if the object class ID is contained within a default partition corresponding to the partition;
    a first activate module that activates an instance of the component in the partition if the object class ID is contained within the default partition;
    a base module that detects if the object class ID is contained within a base partition if the object class ID is not contained within the default partition;
    a second activate module that activates an instance of the component in the base partition if the object class ID is contained in the base partition; and
    a partition moniker module that forms a component ID that uniquely identifies the component across all of the plurality of partitions of the computing system, the component ID including the object class ID, and a partition ID provided either by the client computing system in the request, or by the computing system if the request from the client computing system lacks the partition ID.

9. A system according to claim 8, further comprising:
    a return module that returns a fail message if the object class ID is not contained in the base partition.

10. A system according to claim 8, further comprising:
    a search module that searches for a client ID in a database.

11. A system according to claim 10, further comprising:
    a match module that detects if the client ID exists in the database.

12. A system according to claim 11, further comprising:
    a return module that returns a default value for a default partition if the client ID does not exist in the database.

13. A system according to claim 11, further comprising:
    a return module that returns a fail message if the client ID does not exist in the database.

14. A system according to claim 8, wherein:
    the receive module receives a request to activate a second component having an object class ID and a partition from a first component.

15. A computer storage medium readable by a computing system and encoding instructions for a computer process for activating a component in a computing system having a plurality of partitions, the computer process comprising:
    receiving a request to activate a component having an object class ID from a client computing system having a client ID, wherein the client ID identifies the client computing system;
    mapping the client ID to a partition corresponding to the client ID;
    detecting if the object class ID is contained within a default partition corresponding to the partition;
    if the object class ID is contained within the default partition, activating an instance of the component in the partition;
    if the object class ID is not contained within the default partition, detecting if the object class ID is contained within a base partition;
    if the object class ID is contained in the base partition, activating an instance of the component in the base partition; and
    forming a component ID that uniquely identifies the component across all of the plurality of partitions of the computing system, the component ID including the object class ID, and a partition ID provided either by the client computing system in the request, or by the computing system if not provided by the client computing system in the request.

16. A computer storage medium according to claim 15, further comprising:
    if the object class ID is not contained in the base partition, returning a fail message.

17. A computer storage medium according to claim 15, wherein:
    mapping the client ID includes searching for a client ID in a database.

18. A computer storage medium according to claim 17, wherein:

mapping includes detecting if the client ID exists in the database.

19. A computer storage medium according to claim 18, wherein:
mapping includes if the client ID does not exist in the database mapping to a default value for a default partition.

20. A computer storage medium according to claim 18, wherein:
mapping includes if the client ID does not exist in the database returning a fail message.

21. A computer storage medium according to claim 15, wherein:
receiving a request includes receiving a request to activate a second component having an object class ID and a partition from a first component.

* * * * *